US012145361B2

(12) United States Patent
Toyofuku et al.

(10) Patent No.: US 12,145,361 B2
(45) Date of Patent: Nov. 19, 2024

(54) DRIVE WAVEFORM DETERMINATION METHOD, LIQUID EJECTION APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventors: Atsushi Toyofuku, Shiojiri (JP); Toshiro Murayama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 17/656,683

(22) Filed: Mar. 28, 2022

(65) Prior Publication Data

US 2022/0305776 A1 Sep. 29, 2022

(30) Foreign Application Priority Data

Mar. 29, 2021 (JP) ................................ 2021-054940

(51) Int. Cl.
*B41J 2/045* (2006.01)

(52) U.S. Cl.
CPC ....... *B41J 2/04581* (2013.01); *B41J 2/04553* (2013.01); *B41J 2/04566* (2013.01); *B41J 2/04588* (2013.01)

(58) Field of Classification Search
None
See application file for complete search history.

(56) References Cited

U.S. PATENT DOCUMENTS 5,975,669 A * 11/1999 Ohshima .............. B41J 2/04553 347/14
2012/0327148 A1* 12/2012 Ito ........................ B41J 2/04581 347/10

FOREIGN PATENT DOCUMENTS

| | | | |
|---|---|---|---|
| JP | 2004114577 | | 4/2004 |
| JP | 2005041010 | | 12/2005 |
| JP | 2010131910 | A * | 6/2010 |
| JP | 2012000775 | | 1/2012 |

OTHER PUBLICATIONS

Kimura, Machine TranslationofJP-2010131910-A, 2010 (Year: 2010).*

* cited by examiner

*Primary Examiner* — Scott A Richmond
(74) *Attorney, Agent, or Firm* — WORKMAN NYDEGGER

(57) ABSTRACT

A drive waveform determination method includes: a first acquisition step of executing first acquisition processing for acquiring, in a first environment condition which is a condition of an environment in which a liquid ejection head is provided, first information on an ejection characteristic of a liquid when each of a plurality of drive waveform candidates is applied to a drive element; a second acquisition step of executing second acquisition processing for acquiring, in a second environment condition which is a condition of the environment in which the liquid ejection head is provided and is different from the first environment condition, second information on the ejection characteristic when each of the plurality of drive waveform candidates is applied to the drive element; and a waveform determination step of determining a drive waveform based on the first information and the second information.

20 Claims, 12 Drawing Sheets

DRIVE WAVEFORM DETERMINATION METHOD, LIQUID EJECTION APPARATUS, AND NON-TRANSITORY COMPUTER-READABLE STORAGE MEDIUM STORING PROGRAM

The present application is based on, and claims priority from JP Application Serial Number 2021-054940, filed Mar. 29, 2021, the disclosure of which is hereby incorporated by reference herein in its entirety.

BACKGROUND

1. Technical Field

The present disclosure relates to a drive waveform determination method, a liquid ejection apparatus, and a non-transitory computer-readable storage medium storing a program.

2. Related Art

In the related art, in an ink jet printer, there is a method of determining parameters for defining a waveform of a drive signal based on a result obtained by ejecting ink droplets and measuring an ejection characteristic. In a technique described in JP-A-2010-131910, a plurality of drive signals for which values of the parameters for defining the drive waveform are different from each other are prepared. The ink droplets are ejected from a plurality of nozzles at the same time by using one of the plurality of drive signals. Simultaneous ejection of the ink droplets using one drive signal is performed for different numbers of nozzles of a plurality of nozzles. Such processing is performed for each drive signal. The parameters of the drive signal having a smallest deviation in ejection speed of the ink droplets when the ink droplets are ejected from different numbers of nozzles at the same time are adopted as parameters of the drive signal to be actually used for printing. As a result, in printing, the ink droplets are stably ejected from each nozzle, regardless of the number of nozzles that eject the ink droplets at the same time.

When a condition of an environment in which the printer is used such as a temperature or a humidity is changed, a characteristic of the ink ejected from the nozzle, for example, an ejection amount, an ejection speed, an amount of sub-droplets, or the like is changed. For this reason, even when the parameters are determined using the technique described in JP-A-2010-131910, in a case where a condition of the environment in which the printer is used is changed, a desired ejection characteristic may not be realized. For example, when a device is electronically manufactured by an ink jet apparatus provided in a clean room, a change in ejection amount due to a temperature change greatly affects a quality of a product.

SUMMARY

According to an aspect of the present disclosure, there is provided a drive waveform determination method for determining a drive waveform of a drive signal to be applied to a drive element of a liquid ejection head to eject a liquid from the liquid ejection head. The method includes: a first acquisition step of executing first acquisition processing for acquiring, in a first environment condition which is a condition of an environment in which the liquid ejection head is provided, first information on an ejection characteristic of the liquid when each of a plurality of drive waveform candidates is applied to the drive element; a second acquisition step of executing second acquisition processing for acquiring, in a second environment condition which is a condition of the environment in which the liquid ejection head is provided and is different from the first environment condition, second information on the ejection characteristic when each of the plurality of drive waveform candidates is applied to the drive element; and a waveform determination step of determining the drive waveform based on the first information and the second information.

DESCRIPTION OF EXEMPLARY EMBODIMENTS

A. First Embodiment

A1. Configuration of Printing System

Figure 1:
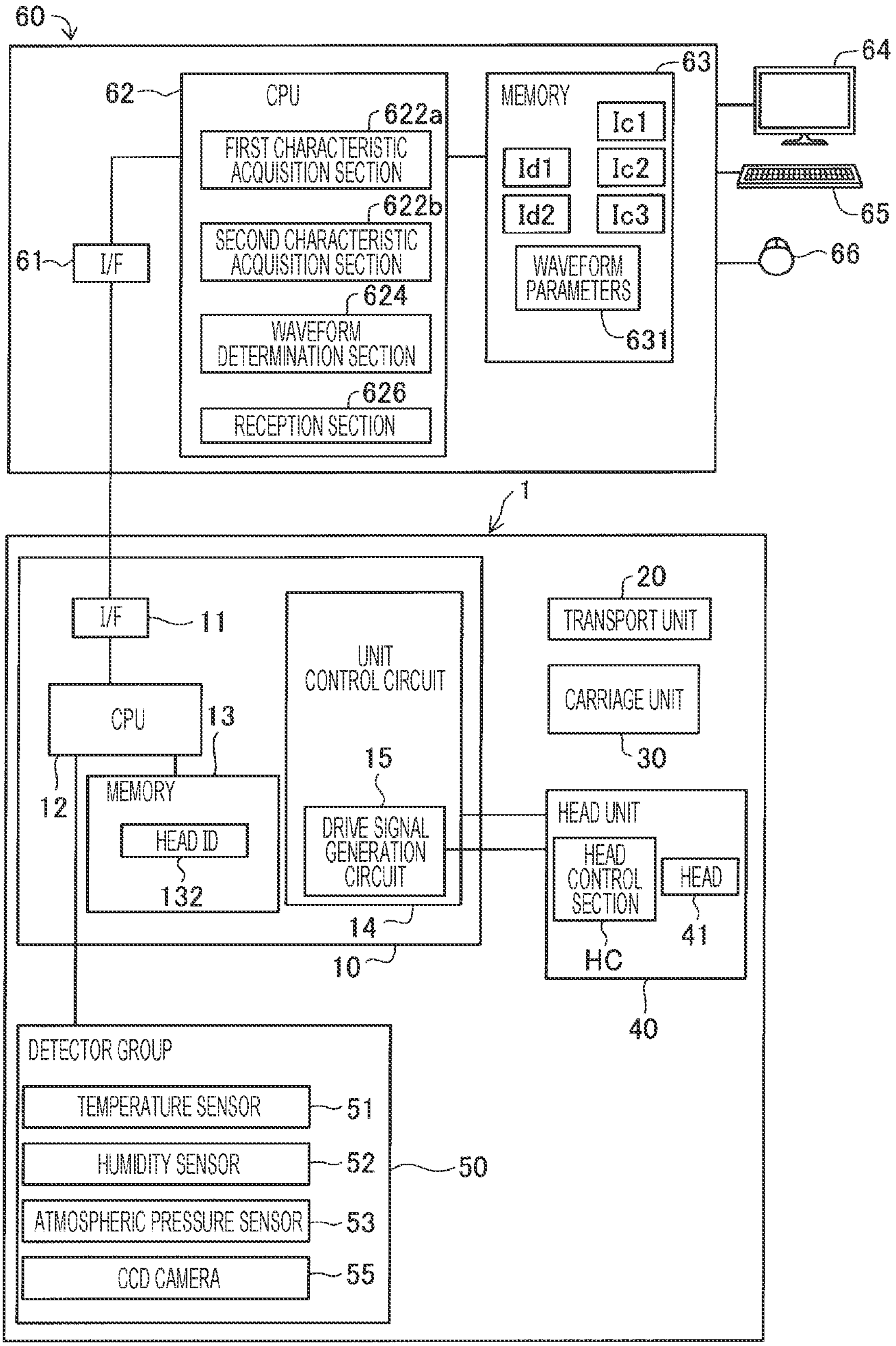
FIG. 1 is a block diagram illustrating a configuration of a printer and a computer included in a printing system according to a first embodiment.

FIG. 1 is a block diagram illustrating a configuration of a printer 1 and a computer 60 included in a printing system according to a first embodiment. The printing system includes the printer 1 and the computer 60.

The printer 1 forms an image on a print medium PM by driving a drive element based on print data and ejecting ink droplets from a nozzle. The printer 1 includes a controller 10, a transport unit 20, a carriage unit 30, a head unit 40, and a detector group 50.

The controller 10 is a control unit that controls the printer 1. The controller 10 includes an interface section 11, a CPU 12, a memory 13, and a unit control circuit 14.

The interface section 11 transmits/receives data between the printer 1 and the computer 60. The memory 13 includes an auxiliary memory that stores a program to be executed by the CPU 12 and a main memory that functions as a work area. The CPU 12 is an arithmetic processing unit that controls the entire printer 1. The CPU 12 as a processor realizes various functions by loading the program stored in the auxiliary memory into the main memory and executing the program. The main memory may be a non-volatile memory. On the other hand, the main memory may be a volatile memory. As the auxiliary memory, both of a non-volatile memory and a volatile memory may be used as appropriate.

The unit control circuit 14 controls each unit of the printer 1 according to an instruction from the CPU 12. The unit control circuit 14 includes a plurality of drive signal generation circuits 15. The drive signal generation circuit 15 generates a drive signal COM including a drive waveform W at regular intervals.

The transport unit 20 transports the print medium PM to a print position, and transports the print medium PM by a transport amount of a pattern predetermined in printing. The carriage unit 30 moves an ink ejection head 41 attached to a carriage 31 in a direction intersecting with a transport direction of the print medium PM. In this specification, a moving direction of the ink ejection head 41 is referred to as a "main scanning direction Dm". The transport direction of the print medium PM is referred to as a "sub scanning direction Ds".

The head unit 40 ejects ink droplets onto the print medium PM. The head unit 40 includes an ink ejection head 41 and a head control section HC. A plurality of nozzles Nz are provided on a lower surface of the ink ejection head 41. The ink ejection head 41 includes a plurality of drive elements PZT. Specifically, the drive element PZT is a piezo element. One drive element PZT is provided for one nozzle Nz. The drive element PZT is driven when the drive signal COM is applied. The ink ejection head 41 ejects an ink from the nozzle Nz when the drive element PZT is driven. In the present embodiment, as the drive element PZT, a piezoelectric element made of lead zirconate titanate is used. On the other hand, a piezoelectric element made of a material other than lead zirconate titanate may be used, or a heating element may be used.

The head control section HC controls whether or not to apply the drive waveform W of the drive signal COM to the drive element PZT corresponding to each nozzle Nz based on the print data. When the drive waveform W is applied to the drive element PZT corresponding to a certain nozzle Nz, an ink amount according to the drive waveform W is ejected from the nozzle Nz, and thus dots are formed on the print medium PM. On the other hand, when the drive waveform W is not applied to the drive element PZT corresponding to a certain nozzle Nz, ink droplets are not ejected from the nozzle Nz.

Figure 2:
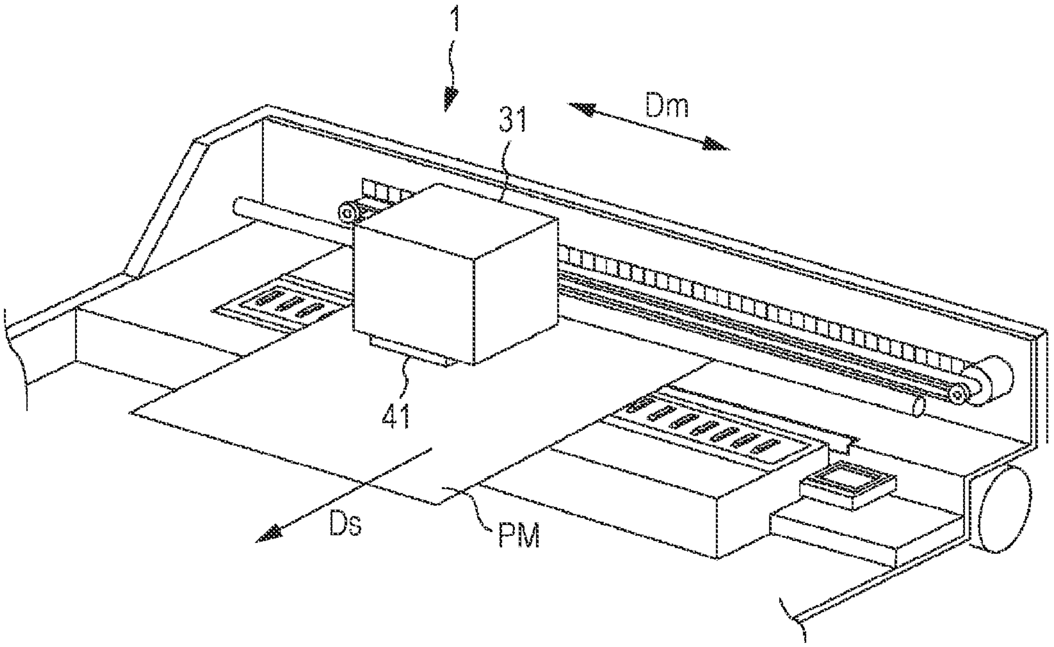
FIG. 2 is a perspective view illustrating a part of the configuration of the printer.

FIG. 2 is a perspective view illustrating a part of the configuration of the printer 1. The printer 1 can perform dot forming processing of forming dots on the print medium PM by intermittently ejecting ink droplets from the ink ejection head 41 moving along the main scanning direction Dm. The printer 1 can perform transport processing of transporting the print medium PM in the sub scanning direction Ds. The printer 1 forms dots at each position on the print medium PM by alternately repeating dot forming processing and transport processing. Thereby, an image is formed.

The detector group 50 monitors a situation of an inside of the printer 1 (refer to a lower part of FIG. 1). The controller 10 controls each section of the printer 1 according to an output signal from the detector group 50. The detector group 50 includes a temperature sensor 51, a humidity sensor 52, an atmospheric pressure sensor 53, and a CCD camera 55.

The temperature sensor 51 measures a temperature, and outputs a signal representing the temperature to the CPU 12. The temperature measured by the temperature sensor 51 is a temperature of an environment in which the ink ejection head 41 is provided. The humidity sensor 52 measures humidity, and outputs a signal representing the humidity to the CPU 12. The humidity measured by the humidity sensor 52 is humidity of the environment in which the ink ejection head 41 is provided. The atmospheric pressure sensor 53 measures an atmospheric pressure, and outputs a signal representing the atmospheric pressure to the CPU 12. The atmospheric pressure measured by the atmospheric pressure sensor 53 is an atmospheric pressure of the environment in which the ink ejection head 41 is provided.

The CCD camera 55 acquires an image of the ink droplets ejected from the ink ejection head 41, and outputs image data to the CPU 12. The CCD camera 55 can capture a still image, and can capture a moving image. In this specification, "image" includes a still image and a moving image.

The CCD camera 55 is used for imaging to acquire information representing an ejection characteristic to be described. On the other hand, when there is a component capable of acquiring information representing an ejection characteristic, the component may be used instead of the CCD camera 55. For example, an electronic balance may be used instead of the CCD camera 55, and information representing an ejection characteristic such as an ejection amount may be acquired.

The computer 60 transmits the print data to the printer 1. The computer 60 transmits, to the printer 1, a parameter representing the drive waveform of the drive signal of the drive element. The computer 60 includes an interface section 61, a CPU 62, a memory 63, a display 64, a keyboard 65, and a mouse 66.

The display 64 outputs an image by a control of the CPU 62. When a user operates the keyboard 65 and the mouse 66, the keyboard 65 and the mouse 66 input an instruction of the user to the CPU 62.

The interface section 61 transmits/receives data between the computer 60 and the printer 1. The memory 63 includes an auxiliary memory that stores a program to be executed by the CPU 62 and a main memory that functions as a work area. The CPU 62 as a processor realizes various functions by loading the program stored in the auxiliary memory into the main memory and executing the program.

For example, the CPU 62 realizes a function of acquiring the information representing the ejection characteristic as an ejection characteristic of the ink ejected from the ink ejection head 41. More specifically, the CPU 62 can acquire, based on the image of the ink droplets acquired by the CCD camera 55, an ejection speed of the ink ejected from the nozzle Nz and an ejection amount of the ink ejected from one nozzle Nz by an ejection operation of the drive element PZT. Further, the CPU 62 realizes a function of determining the drive waveform of the drive signal COM to be applied to the drive element PZT.

Figure 3:
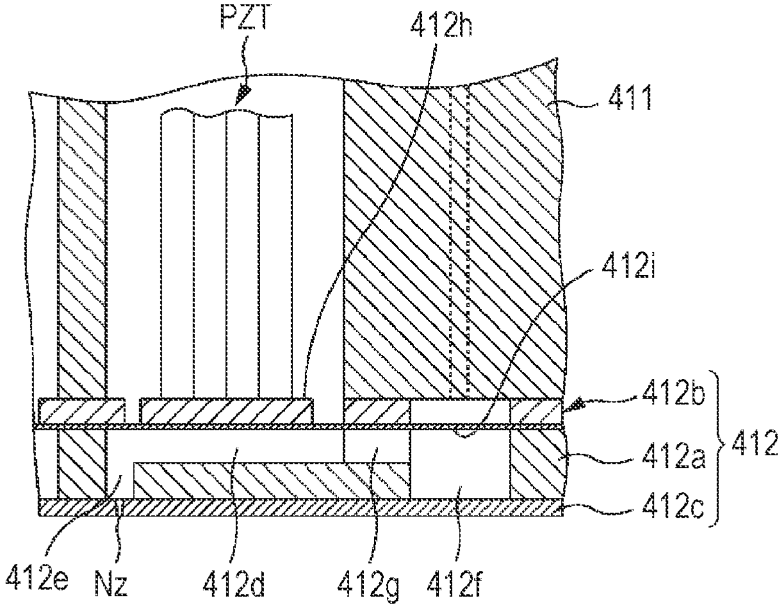
FIG. 3 is a sectional view of an ink ejection head in a section perpendicular to a sub scanning direction.

FIG. 3 is a sectional view of the ink ejection head 41 in a section perpendicular to the sub scanning direction Ds. The ink ejection head 41 includes a case 411, a flow path unit 412, and a plurality of drive elements PZT. The case 411 accommodates the plurality of drive elements PZT. The flow path unit 412 is joined to a lower surface of the case 411.

The flow path unit 412 includes a flow path forming plate 412*a*, an elastic plate 412*b*, and a nozzle plate 412*c*.

On the flow path forming plate 412*a*, a groove portion that functions as a pressure chamber 412*d*, a through hole that functions as a nozzle communication hole 412*e*, a through hole that functions as a common ink chamber 412*f*, and a groove portion that functions as an ink supply path 412*g* are formed. In the ink ejection head 41, an ink is supplied to the pressure chamber 412*d* via the common ink chamber 412*f* and the ink supply path 412*g*. The ink in the pressure chamber 412*d* is ejected from the nozzle Nz via the nozzle communication hole 412*e*. For one nozzle Nz, a set of combinations of the ink supply path 412*g*, the pressure chamber 412*d*, and the nozzle communication hole 412*e* is provided.

The elastic plate 412*b* includes an island portion 412*h* to which an end of the drive element PZT is joined. An elastic region formed by an elastic film 412*i* is formed around the island portion 412*h*.

The nozzle plate 412*c* is a plate on which the plurality of nozzles Nz are formed. On a surface of the nozzle Nz, which is one surface of the nozzle plate 412*c*, a yellow nozzle row for ejecting a yellow ink, a magenta nozzle row for ejecting a magenta ink, a cyan nozzle row for ejecting a cyan ink, and a black nozzle row for ejecting a black ink are formed. Each nozzle row includes 180 nozzles Nz arranged at predetermined intervals in the sub scanning direction Ds. FIG. 3 is a sectional view of a section perpendicular to the sub scanning direction Ds. In the unit control circuit 14, for one nozzle row, one drive signal generation circuit 15 is provided.

The plurality of drive elements PZT are configured with a plurality of comb-shaped elements. The drive signal COM is applied to the drive element PZT by a wiring board on which the head control section HC and the like are provided. The drive element PZT is expanded or contracted according to a potential of the drive signal COM. When the drive element PZT is expanded, the island portion 412*h* is deformed toward the pressure chamber 412*d* side. When the drive element PZT is contracted, the island portion 412*h* is deformed toward the drive element PZT side. As a result, a pressure in the pressure chamber 412*d* is changed, and ink droplets are ejected from the nozzle Nz. For one nozzle row, one drive signal generation circuit 15 is provided. Therefore, the drive signal COM generated by a certain drive signal generation circuit 15 is commonly applied to the drive elements PZT of all nozzles Nz belonging to the nozzle row corresponding to the drive signal generation circuit 15.

Figure 4:
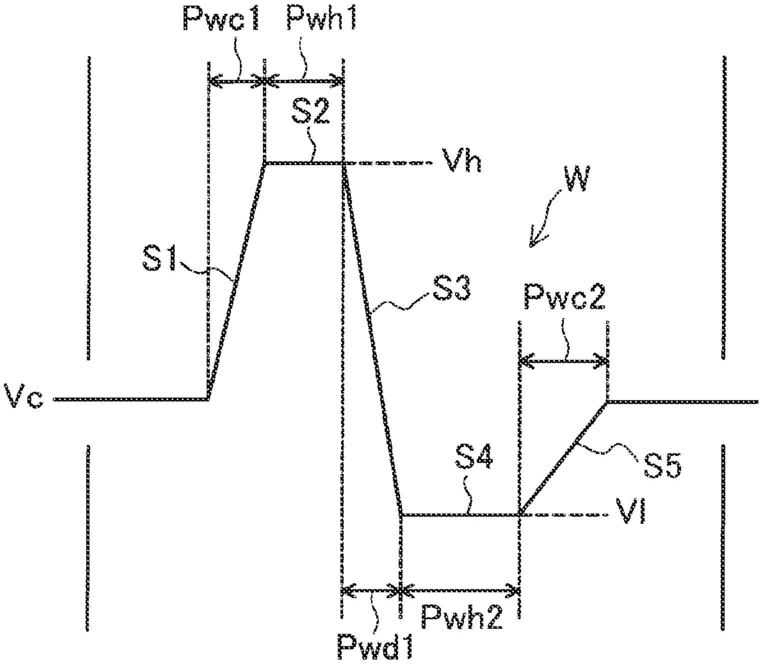
FIG. 4 is a diagram illustrating a drive waveform of a drive signal.

FIG. 4 is a diagram illustrating the drive waveform W of the drive signal COM. In the drive signal COM, the drive waveform W illustrated in FIG. 4 is repeatedly generated at a constant period.

The drive waveform W includes a first expansion component S1 in which a potential increases from an intermediate potential Vc to a highest potential Vh, a first hold component S2 in which the highest potential Vh is maintained, a contraction component S3 in which a potential decreases from the highest potential Vh to a lowest potential Vl, a second hold component S4 in which the lowest potential Vl is maintained, and a second expansion component S5 in which a potential increases from the lowest potential Vl to the intermediate potential Vc.

In a state where the intermediate potential Vc is applied to the drive element PZT, the drive element PZT is not expanded or contracted. A volume of the pressure chamber 412*d* when the intermediate potential Vc is applied to the drive element PZT is referred to as a "reference volume".

In a state where the intermediate potential Vc is applied to the drive element PZT, when the first expansion component S1 of the drive signal COM is applied to the drive element PZT, the drive element PZT is contracted in a longitudinal direction. As a result, the volume of the pressure chamber 412*d* is increased (refer to FIG. 3). When the first hold component S2 of the drive signal COM is applied to the drive element PZT, a contracted state of the drive element PZT is maintained. At this time, an expanded state of the pressure chamber 412*d* is also maintained. When the contraction component S3 of the drive signal COM is applied to the drive element PZT, the drive element PZT is expanded from the contracted state. As a result, the volume of the pressure chamber 412*d* is decreased. Thus, an ink pressure in the pressure chamber 412*d* is increased, and ink droplets are ejected from the nozzle Nz. Thereafter, when the second hold component S4 of the drive signal COM is applied to the drive element PZT, the expanded state of the drive element PZT is maintained, and the contracted state of the pressure chamber 412*d* is maintained. When the second expansion component S5 is applied to the drive element PZT, the volume of the pressure chamber 412*d* returns to the reference volume.

A time during which the first expansion component S1 appears is referred to as a "first expansion time Pwc1". A time during which the first hold component S2 appears is referred to as a "first hold time Pwh1". A time during which the contraction component S3 appears is referred to as a "contraction time Pwd1". A time during which the second hold component S4 appears is referred to as a "second hold time Pwh2". A time during which the second expansion component S5 appears is referred to as a "second expansion time Pwc2". The first expansion time Pwc1, the first hold time Pwh1, the contraction time Pwd1, the second hold time Pwh2, and the second expansion time Pwc2 are parameters for defining a shape of the drive waveform W of the drive signal COM.

A2. Determination of Drive Waveform

Figure 5:
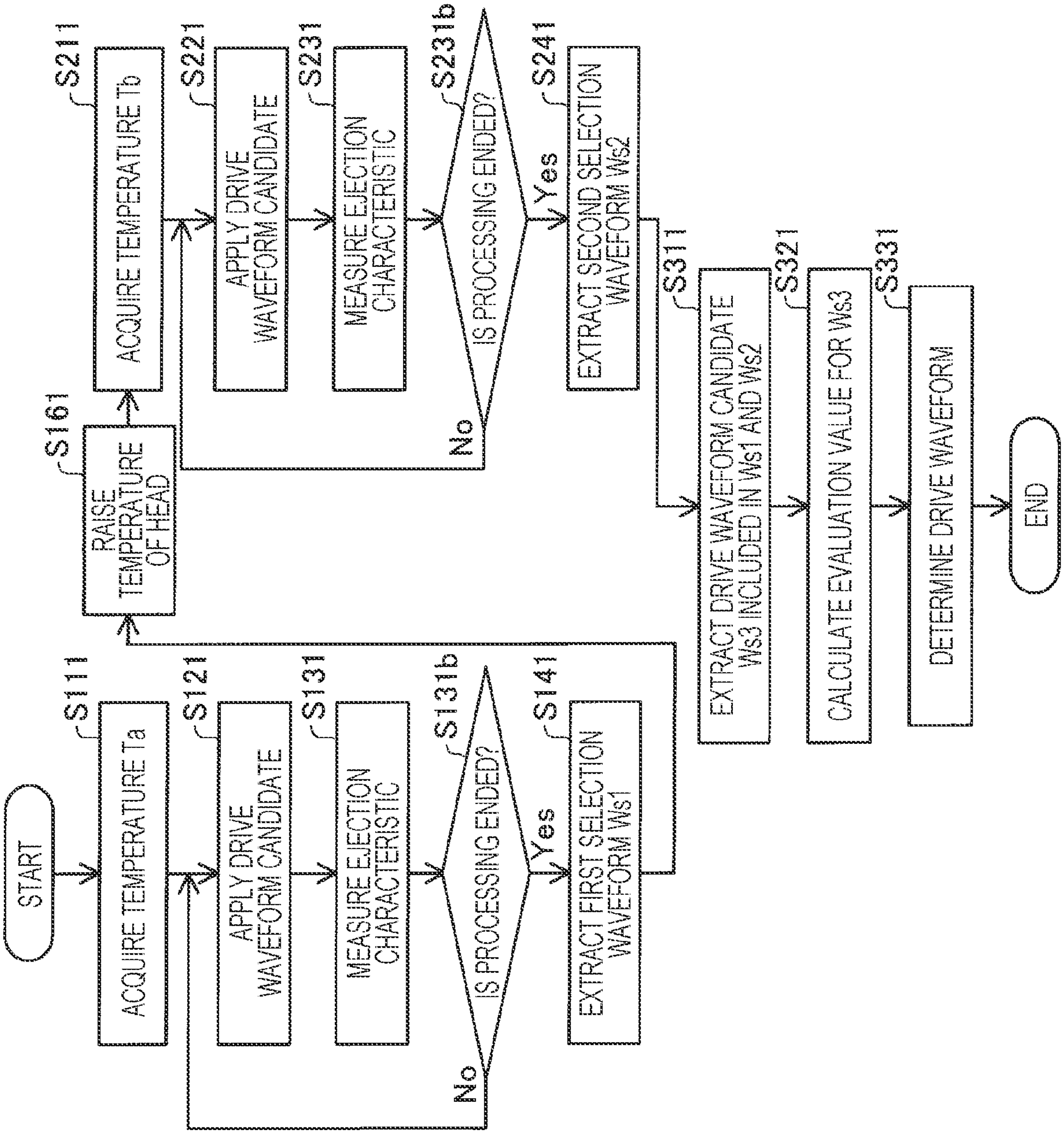
FIG. 5 is a flowchart illustrating a method of determining the drive waveform of the drive signal to be applied to the printer.

FIG. 5 is a flowchart illustrating a method of determining the drive waveform of the drive signal to be applied to the printer 1. The CPU 62 of the computer 60 mainly controls each section according to an instruction input from the user, and thus processing of FIG. 5 is executed. By the processing illustrated in FIG. 5, the drive waveform of the drive signal COM to be applied to the drive element PZT to eject the ink from the ink ejection head 41 is determined.

In step S111, the CPU 62 acquires a temperature Ta of an environment in which the printer 1 is provided using the temperature sensor 51 of the printer 1. An environment condition defined by the temperature Ta measured in step S111 is also referred to as a "first environment condition". The temperature Ta is transmitted to the computer 60 via the CPU 12 and the interface section 11 of the printer 1.

In step S121, the CPU 62 selects one of a plurality of predetermined drive waveform candidates Wci, and transmits a set of parameters representing the selected drive waveform candidate Wci to the printer 1 (refer to FIG. 4). The plurality of predetermined drive waveform candidates Wci are candidates for the drive waveform W of the drive signal COM to be applied to the printer 1. A plurality of sets of parameters representing the drive waveform candidates Wci are stored in the memory 63 in advance. In FIG. 1, a plurality of sets of parameters representing the plurality of drive waveform candidates Wci are illustrated as "waveform parameters 631".

The CPU 62 instructs the CPU 12 of the printer 1 to execute the following processing. The CPU 12 generates a drive signal based on a set of parameters representing one of the received drive waveform candidates Wci by controlling the unit control circuit 14. The drive signal COM is applied to the drive element PZT of the ink ejection head 41. As a result, ink droplets are ejected from the nozzle Nz.

In step S131, the CPU 12 causes the CCD camera 55 to capture an image of the ink droplets ejected from the nozzle Nz by the drive signal COM. The CPU 12 transmits image data of the image to the computer 60. In step S121, the CPU 62 of the computer 60 instructs the CPU 12 of the printer 1 to execute processing after step S121 and step S131.

In step S131, the CPU 62 calculates, based on the image data, an ejection amount Pwa of the ink ejected from one nozzle Nz of the ink ejection head 41 by an ejection operation of the drive element PZT. The ejection amount of the ink is defined by mass. Since the mass is based on a volume and an ink density, the ejection amount of the ink may be defined by the volume. The ejection amount of the ink is one aspect of "ejection characteristic". The CPU 62 stores, in the memory 63, information of the ejection characteristic under the environment of the temperature Ta by associating with information for specifying the drive waveform candidate Wci applied to the drive element PZT. The information representing the ejection characteristic is referred to as "first information Ic1". As the ejection amount Pwa of the ink, an ejection amount ejected from one nozzle Nz by a one ejection operation of the drive element PZT may be used.

In this specification, in the processing executed in step S121 and the processing executed in step S131, processing of acquiring the first information Ic1 is referred to as "first acquisition processing", the first information Ic1 being information representing the ejection characteristic of the ink when a certain drive waveform candidate Wci is applied to the drive element PZT at the temperature Ta representing the condition of the environment in which the ink ejection head 41 of the printer 1 is provided.

In step S131*b*, the CPU 62 determines whether or not the processing of step S121 and the processing of step S131 are executed for all the drive waveform candidates Wci for which the first acquisition processing needs to be executed. When the processing of step S121 and the processing of step S131 are executed for all the drive waveform candidates Wci for which the first acquisition processing needs to be executed, processing proceeds to step S141. When the processing of step S121 and the processing of step S131 are not executed for all the drive waveform candidates Wci for which the first acquisition processing needs to be executed, processing returns to step S121. In this case, one drive waveform candidate Wci for which the processing of step S121 and the processing of step S131 are not yet executed is selected from the plurality of drive waveform candidates Wci, and the processing of step S121 and the processing of step S131 are executed.

By repeating the processing of step S121 and the processing of step S131, the first acquisition processing is executed for each of the plurality of predetermined drive waveform candidates Wci. As a result, the first information Ic1 for the plurality of predetermined drive waveform candidates Wci is stored in the memory 63 (refer to FIG. 1).

That is, in the first embodiment, the first acquisition processing of acquiring the first information Ic1 is executed by applying, under the environment of the temperature Ta, the drive waveform candidate Wci to the drive element PZT and measuring the ejection characteristic of the ink droplets ejected from the ink ejection head 41 (refer to step S121 and step S131 in FIG. 5). In FIG. 1, a functional section of the CPU 62 that executes processing of step S121 to step S131*b* is illustrated as a first characteristic acquisition section 622*a*.

In step S141 of FIG. 5, the CPU 62 extracts the drive waveform candidate Wci for which the ejection characteristic indicated by the first information Ic1 satisfies a predetermined first condition, as a first selection waveform Ws1.

First, the CPU 62 acquires first deviation information Id1 indicating a difference between the ejection characteristic indicated by the first information Ic1 and a target ejection characteristic which is an ideal ejection characteristic. As a specific example, a value Dwa is calculated as the first deviation information Id1 by the following equation.

$$Dwa=|Pwt-Pwa| \tag{1}$$

Here, Pwt is an ideal ejection amount.

Pwa is the ejection amount indicated by the first information Ic1 and is the ejection amount when a certain drive waveform candidate Wci is applied to the printer 1.

When Thwa is a positive number, the CPU 12 extracts, among the plurality of drive waveform candidates Wci, the drive waveform candidate satisfying $Dwa \leq Thwa$, as the first selection waveform Ws1.

In step S161, the CPU 62 waits until the temperature acquired by the temperature sensor 51 reaches a predetermined temperature. Specifically, the user changes the temperature of the environment in which the printer 1 is provided by using a temperature changing machine such as an air conditioner or a constant temperature bath. When the temperature acquired by the temperature sensor 51 becomes a temperature significantly different from the temperature Ta by a predetermined temperature difference, processing proceeds to step S211. The user may not have to operate the temperature changing machine. In step S161, the computer may change the temperature of the environment by automatically operating the temperature changing machine. Further, in S161, the temperature of the environment may be raised, or the temperature of the environment may be lowered.

In step S211, the CPU 62 acquires a temperature Tb of an environment in which the printer 1 is provided using the temperature sensor 51 of the printer 1. An environment condition defined by the temperature Tb measured in step S211 is also referred to as a "second environment condition". Processing of step S211 is the same as processing of step S111.

Processing of step S221, processing of step S231, and processing of step S231*b* are respectively the same as the processing of step S121, the processing of step S131, and the processing of step S131*b*. Here, while the processing of step S121, the processing of step S131, and the processing of step S131*b* are executed under the environment of the temperature Ta, the processing of step S221, the processing of step S231, and the processing of step S231*b* are executed under the environment of the temperature Tb. In FIG. 1, a functional section of the CPU 62 that executes processing of step S221 to step S231*b* is illustrated as a second characteristic acquisition section 622*b*.

In the processing executed in step S221 and the processing executed in step S231, processing of acquiring second information Ic2 is referred to as "second acquisition processing", the second information Ic2 being information representing the ejection characteristic of the ink when a certain drive waveform candidate Wci is applied to the drive element PZT at the temperature Tb representing the condition of the environment in which the ink ejection head 41 of the printer 1 is provided.

By repeating the processing of step S221 and the processing of step S231, the second acquisition processing is executed for each of the plurality of predetermined drive waveform candidates Wci. As a result, the second information Ic2 for the plurality of predetermined drive waveform candidates Wci is stored in the memory 63 (refer to FIG. 1). The second information Ic2 is information of the ejection characteristic under the environment of the temperature Tb, and is associated with the information for specifying the drive waveform candidate Wci applied to the drive element PZT.

That is, in the first embodiment, the second acquisition processing of acquiring the second information Ic2 is executed by applying, under the environment of the temperature Tb, the drive waveform candidate Wci to the drive element PZT and measuring the ejection characteristic of the ink droplets ejected from the ink ejection head 41 (refer to step S221 and step S231 in FIG. 5).

In step S241, the CPU 62 extracts the drive waveform candidate Wci for which the ejection characteristic indicated by the second information Ic2 stored in the memory 63 satisfies a predetermined second condition, as a second selection waveform Ws2.

First, the CPU 62 acquires second deviation information Id2 indicating a difference between the ejection characteristic indicated by the second information Ic2 and a target ejection characteristic which is an ideal ejection characteristic. As a specific example, a value Dwb is calculated as the second deviation information Id2 by the following equation.

$$Dwb=|Pwt-Pwb| \quad (2)$$

Here, Pwb is the ejection amount indicated by the second information Ic2 and is the ejection amount when a certain drive waveform candidate Wci is applied to the printer 1.

Processing of acquiring the first deviation information Id1 and the second deviation information Id2 is also referred to as a “fourth acquisition processing”.

When Thwb is a positive number, the CPU 12 extracts, among the plurality of drive waveform candidates Wci, the drive waveform candidate satisfying $Dwb \leq Thwb$, as the second selection waveform Ws2.

By performing processing of step S141 and processing of step S241, the drive waveform W is determined based on the first deviation information Id1 and the second deviation information Id2. As a result, the drive waveform candidate, for which the ejection characteristic Pwa indicated by the first information Ic1 satisfies the predetermined condition [$|Pwt-Pwa| \leq Thwa$] and the ejection characteristic indicated by the second information Ic2 satisfies the predetermined condition [$|Pwt-Pwb| \leq Thwb$], is determined as the drive waveform W.

In step S311, the CPU 62 extracts the drive waveform candidate Wci included in both of the first selection waveform Ws1 and the second selection waveform Ws2, as a third selection waveform Ws3. In the first embodiment, it is assumed that, among the plurality of predetermined drive waveform candidates Wci, one or more drive waveform candidates Wci included in both of the first selection waveform Ws1 and the second selection waveform Ws2 exist.

In step S321, the CPU 62 acquires third information Ic3 on a difference between the ejection characteristic indicated by the first information Ic1 and the ejection characteristic indicated by the second information Ic2, the ejection characteristics being obtained by using the same drive waveform candidate. The processing is referred to as “third acquisition processing”. The CPU 62 executes the third acquisition processing for the drive waveform candidate Wci included in the third selection waveform Ws3.

As a specific example, the CPU 62 calculates, as the third information Ic3, an evaluation value DP1 for the drive waveform candidate Wci included in the third selection waveform Ws3 by the following equation.

$$DP1=|Pwb-Pwa| \quad (3)$$

In step S331, the CPU 62 determines the drive waveform W based on the evaluation value DP1. Specifically, the CPU 62 determines, as the drive waveform W of the drive signal COM to be applied to the drive element PZT of the ink ejection head 41, the drive waveform candidate Wci having the smallest evaluation value DP1 among the drive waveform candidates Wci included in the third selection waveform Ws3.

As a result, in step S331, the drive waveform W is determined based on the first information Ic1, the second information Ic2, and at least a part of the plurality of predetermined drive waveform candidates Wci (refer to step S141, step S241, step S321, and step S331 in FIG. 5). The drive waveform candidate having a small difference between the ejection characteristic indicated by the first information Ic1 and the ejection characteristic indicated by the second information Ic2 is preferentially determined as the drive waveform W (refer to step S321 and step S331 in FIG. 5). In FIG. 1, a functional section of the CPU 62 that executes processing of step S311 to step S331 is illustrated as a waveform determination section 624.

According to such an aspect, it is possible to determine the drive waveform W for which a liquid ejection amount as one aspect of the ejection characteristic is unlikely to be changed even when the temperature defining the environment condition in which the printer is provided is changed.

Further, prior to step S321, the processing of step S141 and the processing of step S241 are performed. Thus, by the processing of step S141, the processing of step S241, the processing of step S321, and the processing of step S331, the drive waveform W is determined based on the first deviation information Id1 and the second deviation information Id2. The drive waveform candidate having a small difference between the ejection characteristic indicated by the first information Ic1 and the target ejection characteristic and a small difference between the ejection characteristic indicated by the second information Ic2 and the target ejection characteristic is preferentially determined as the drive waveform W.

As a result, the drive waveform W is determined in consideration of the difference Dwa and the difference Dwb, the difference Dwa being represented by the first deviation information Id1 and indicating the difference between the ejection characteristic under the environment of the temperature Ta and the ideal ejection characteristic, and the difference Dwb being represented by the second deviation information Id2 and indicating the difference between the ejection characteristic under the environment of the temperature Tb and the ideal ejection characteristic. Therefore, for example, when the drive waveform candidate Wci has a small difference DP1 between the ejection characteristic under the environment of the temperature Ta and the ejection characteristic under the environment of the temperature Tb and the ejection characteristic under the environment of the temperature Ta and the ejection characteristic under the environment of the temperature Tb both greatly deviate from the ideal ejection characteristic, it is possible to prevent a situation where the drive waveform candidate Wci is determined as the drive waveform W.

In the first embodiment, by using the drive element PZT to which the drive signal COM having the determined drive waveform W is applied, the ejection characteristic under the environment of the temperature Ta as the first environment condition and the ejection characteristic under the environment of the temperature Tb as the second environment condition are measured (refer to step S131 and step S231 in FIG. 5). Therefore, the drive waveform W is determined so as to be suitable for the drive element PZT to which the drive signal COM having the determined drive waveform W is applied.

Further, processing different from the flowchart illustrated in FIG. 5 may be performed as long as a method can obtain the same effect as the effect according to the first embodiment. For example, extraction of the first selection waveform Ws1 in step S141 and extraction of the second selection waveform Ws2 in step S241 may be omitted. In this case, in step S311, extraction of the first selection waveform Ws1 and extraction of the second selection waveform Ws2 may be performed, and extraction of the third selection waveform Ws3 as the drive waveform candidate may be performed.

The printing system according to the present embodiment is also referred to as a "liquid ejection apparatus" (refer to FIG. 1). The ink ejection head 41 is also referred to as a "liquid ejection head". The unit control circuit 14 is also referred to as a "drive control section". In FIG. 5, the step S131 that is repeatedly executed is also referred to as a "first acquisition step". The step S231 that is repeatedly executed is also referred to as a "second acquisition step". The step S321 is also referred to as a "third acquisition step". The step S141 and the step S241 are also referred to as a "fourth acquisition step". The step S331 is also referred to as a "waveform determination step".

B. Second Embodiment

Figure 6:
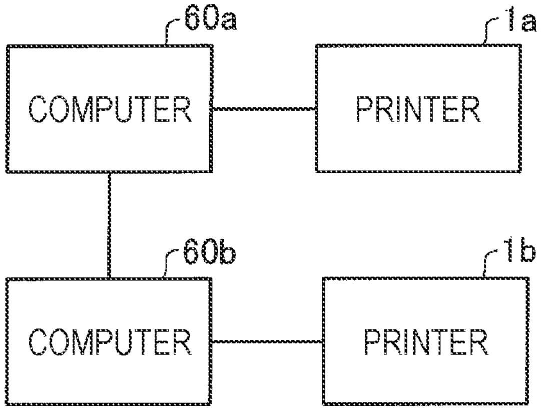
FIG. 6 is a block diagram illustrating printers and computers included in a printing system according to a second embodiment.

FIG. 6 is a block diagram illustrating printers 1*a* and 1*b* and computers 60*a* and 60*b* included in a printing system according to a second embodiment. In the second embodiment, the printing system includes a combination of the computer 60*a* and the printer 1*a* and a combination of the computer 60*b* and the printer 1*b*.

The computer 60*a* and the computer 60*b* are connected to each other so as to communicate with each other. The configurations of the computers 60*a* and 60*b* are the same as the configuration of the computer 60 according to the first embodiment described with reference to FIG. 1.

The configurations of the printers 1*a* and 1*b* are the same as the configuration of the printer 1 according to the first embodiment described with reference to FIG. 1 and FIG. 2. The printers 1*a* and 1*b* may be printers of the same model. On the other hand, printers of different models may be used. In the environments in which the printers 1*a* and 1*b* are provided, temperatures, humidities, and atmospheric pressures are different from each other.

Figure 7:
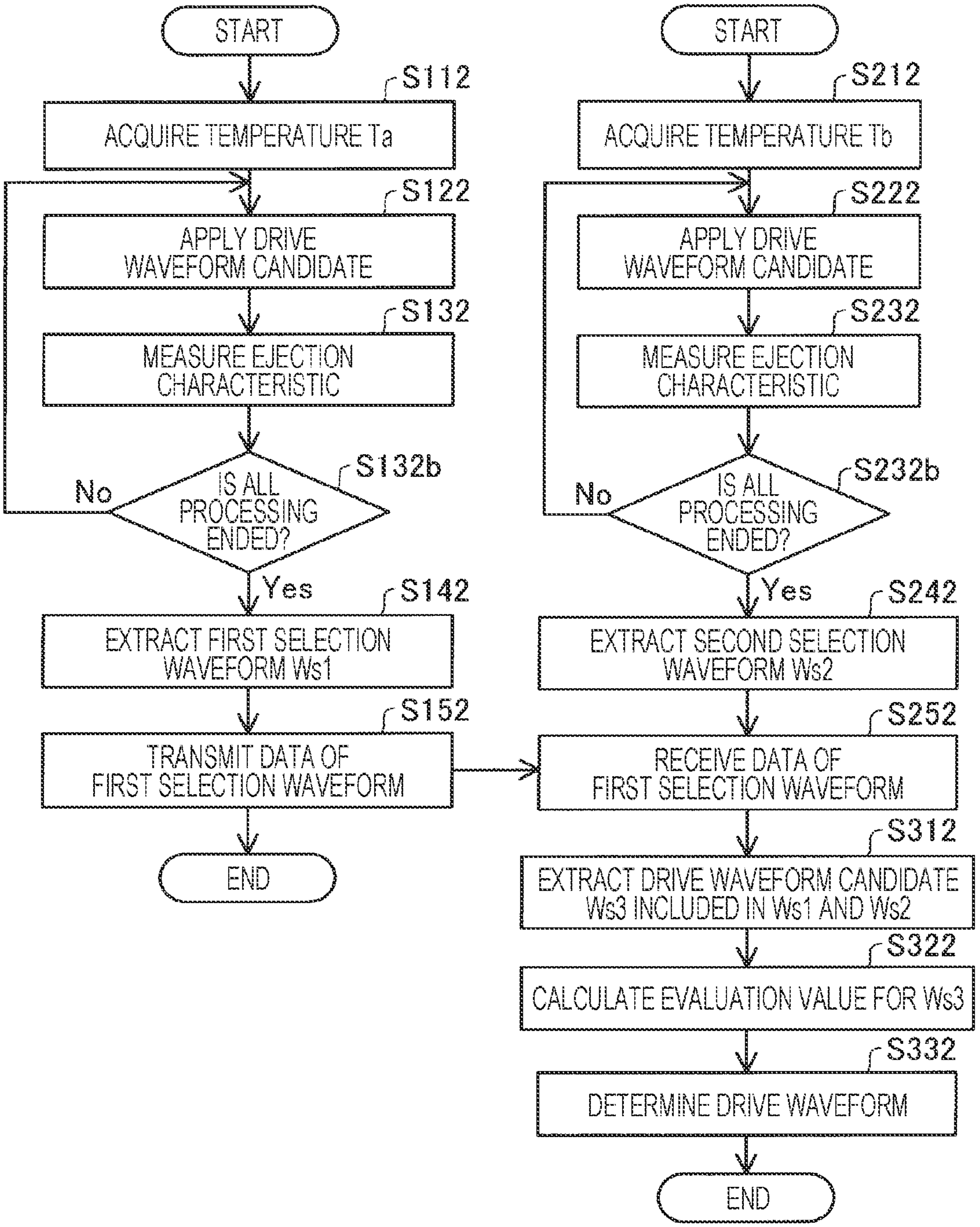
FIG. 7 is a flowchart illustrating a method of determining the drive waveform of the drive signal to be applied to the printer according to the second embodiment.

FIG. 7 is a flowchart illustrating a method of determining the drive waveform of the drive signal to be applied to the printer 1*b* according to the second embodiment. The method of FIG. 7 corresponds to the method according to the first embodiment illustrated in FIG. 5. In steps of FIG. 7, for steps corresponding to the steps of FIG. 5 according to the first embodiment, a first digit and a second digit of the reference numeral representing the step are the same as the first digit and the second digit of the corresponding step of FIG. 5.

In the computer 60*a* and the printer 1*a*, processing of step S112 to step S152 is performed.

Processing of step S112 to step S142 is the same as the processing of step S111 to step S141 of FIG. 5, except that a target printer is the printer 1*a*.

In step S152, the CPU 62 of the computer 60*a* transmits, to the computer 60*b*, for the drive waveform candidate Wci included in the first selection waveform Ws1, the parameters for defining the shape of the waveform and the ink ejection amount Pwa in association with the information for specifying the drive waveform candidate Wci. Thereafter, processing in the computer 60*a* and the printer 1*a* is ended.

In the computer 60*b* and the printer 1*b*, processing of step S212 to step S332 is performed.

Processing of step S212 to step S242 is the same as the processing of step S111 to step S141 of FIG. 5, except that a target printer is the printer 1*b*. The same waveform parameters 631 are stored in the memories 63 of the printers 1*a* and 1*b* of the same model (refer to step S122 and step S222 in FIG. 7).

In step S252, the CPU 62 of the computer 60*b* receives, from the computer 60*a*, the parameters for defining the shape of the waveform and the ink ejection amount Pwa that are associated with the information for specifying the drive waveform candidate Wci.

In step S312, the CPU 62 of the computer 60*b* extracts the drive waveform candidate Wci included in both of the first selection waveform Ws1 and the second selection waveform Ws2, as a third selection waveform Ws3. In the second embodiment, it is assumed that, among the plurality of predetermined drive waveform candidates Wci, one or more drive waveform candidates Wci included in both of the first selection waveform Ws1 and the second selection waveform Ws2 exist.

Processing of step S322 and processing of step S332 are respectively the same as the processing of step S321 and the processing of step S331 of FIG. 5.

According to such an aspect, as in the first embodiment, it is possible to determine the drive waveform W for which the ejection characteristic is unlikely to be changed even when the temperature defining the environment condition in which the printer is provided is changed.

Further, in the second embodiment, the ejection characteristic under the environment of the temperature Ta and the ejection characteristic under the environment of the temperature Tb can be measured in parallel (refer to processing of step S122 to step S132*b* and processing of step S222 to step S232*b* in FIG. 7). Thus, the first information Ic1 and the second information Ic2 can be acquired in a short time (refer to FIG. 3). Therefore, it is possible to determine the drive waveform W to be used in the printer 1*b* in a short time.

C. Third Embodiment

Figure 8:
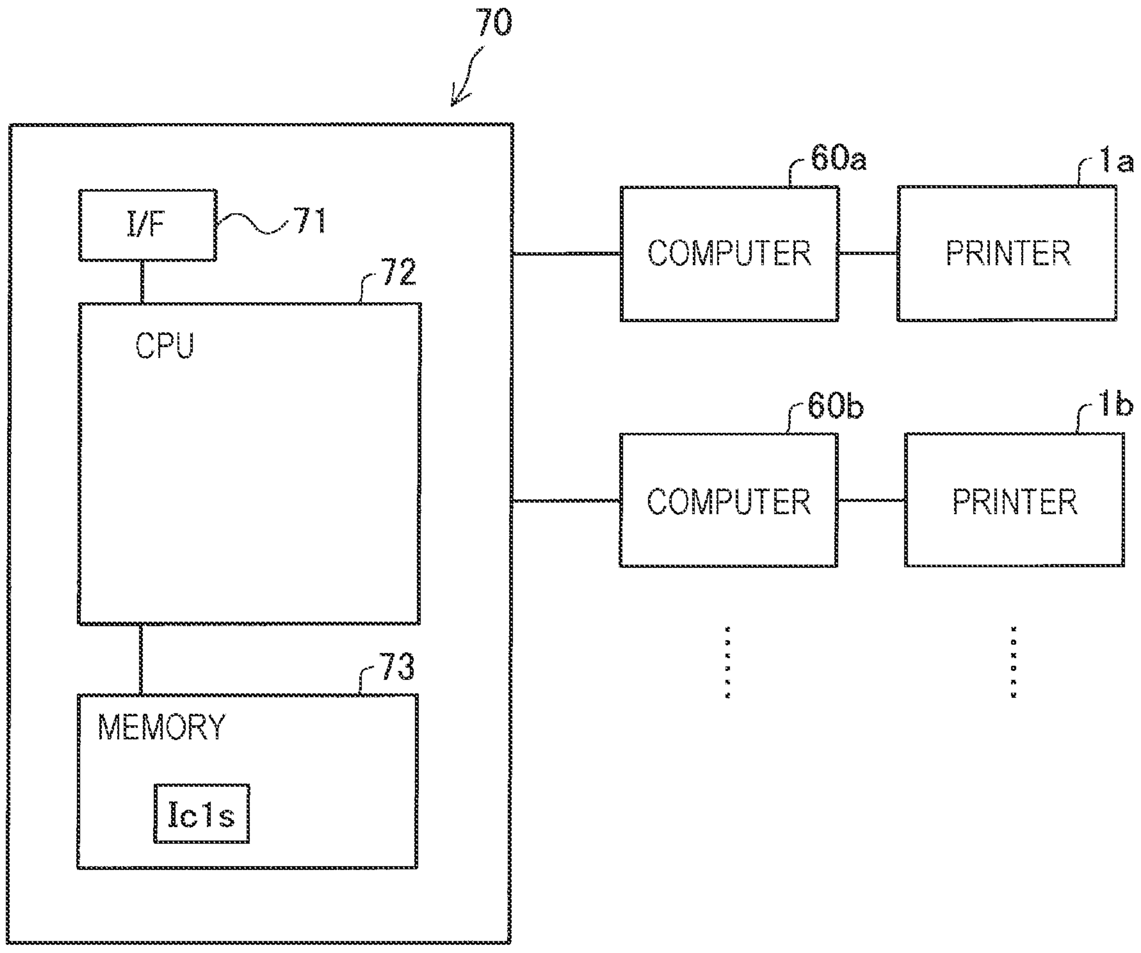
FIG. 8 is a block diagram illustrating printers, computers, and a server included in a printing system according to a third embodiment.

FIG. 8 is a block diagram illustrating printers 1*a* and 1*b*, computers 60*a* and 60*b*, and a server 70 included in a printing system according to a third embodiment. In the third embodiment, the printing system includes a combination of the computer 60*a* and the printer 1*a*, a combination of the computer 60*b* and the printer 1*b*, and the server 70. Another combination of a computer and a printer is connected to the server 70. In the third embodiment, focusing on the combination of the computer 60*a* and the printer 1*a*, the combination of the computer 60*b* and the printer 1*b*, and the server 70, contents of a technique will be described.

The configurations of the computers 60*a* and 60*b* are the same as the configuration of the computer 60 according to the first embodiment described with reference to FIG. 1. The configurations of the printers 1*a* and 1*b* are the same as the configuration of the printer 1 according to the first embodiment described with reference to FIG. 1 and FIG. 2. The printers 1*a* and 1*b* may be printers of the same model. On the other hand, printers of different models may be used. The combination of the computer 60*a* and the printer 1*a* and the combination of the computer 60*b* and the printer 1*b* may be owned by different users. In the environments in which the printers 1*a* and 1*b* are provided, temperatures, humidities, and atmospheric pressures are different from each other.

The server 70 includes an interface section 71, a CPU 72, and a memory 73. The interface section 71 transmits/receives data between the server 70 and the computers 60*a* and 60*b*. The memory 73 includes an auxiliary memory that stores a program to be executed by the CPU 72 and a main memory that functions as a work area. The CPU 72 as a processor realizes various functions by loading the program stored in the auxiliary memory into the main memory and executing the program.

Figure 9:
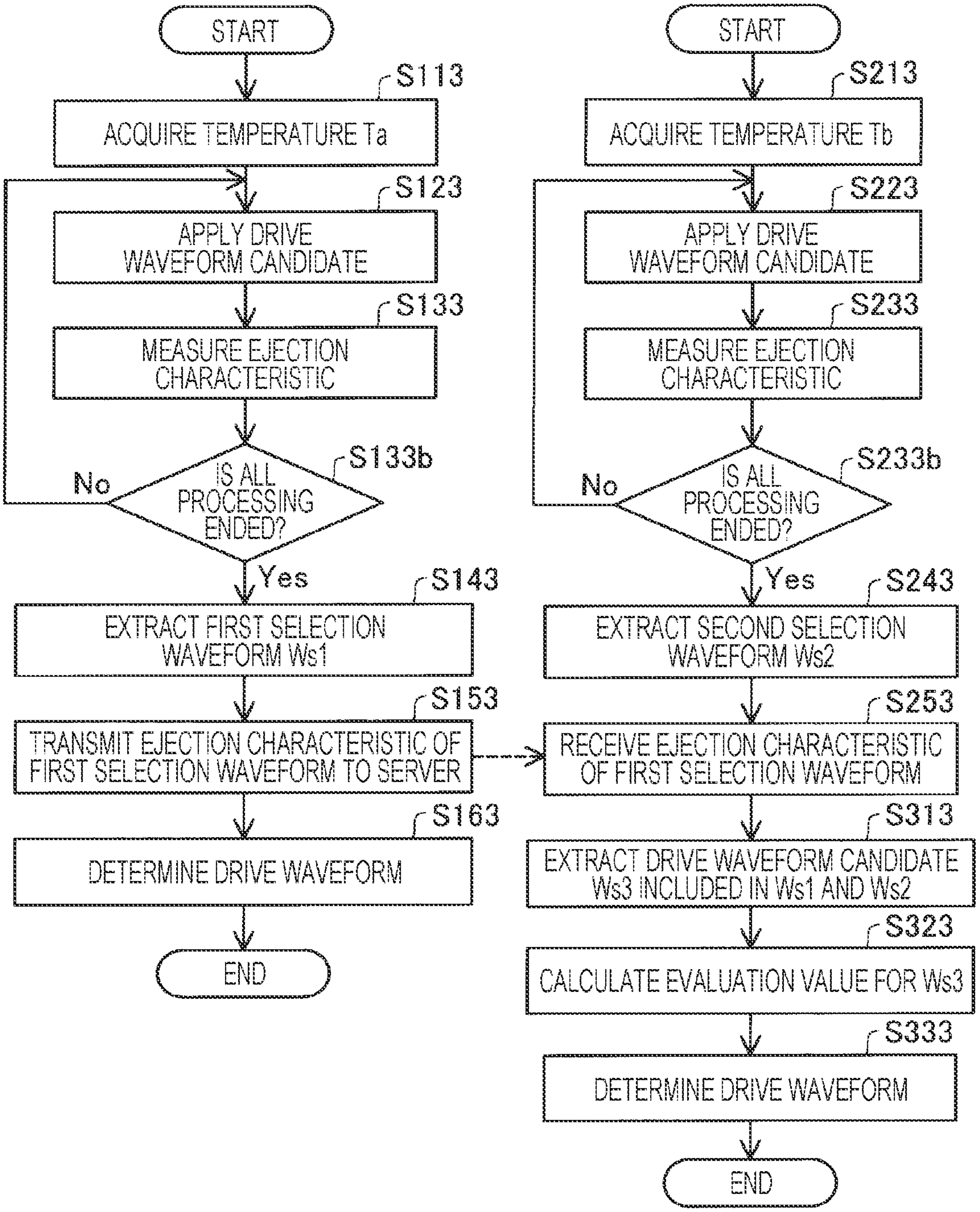
FIG. 9 is a flowchart illustrating a method of determining the drive waveform of the drive signal to be applied to the printers according to the third embodiment.

FIG. 9 is a flowchart illustrating a method of determining the drive waveform of the drive signal to be applied to the printers 1*a* and 1*b* according to the third embodiment. The method of FIG. 9 corresponds to the method according to the first embodiment illustrated in FIG. 5 and the method according to the second embodiment illustrated in FIG. 7. In steps of FIG. 9, for steps corresponding to the steps of FIG. 5 according to the first embodiment, a first digit and a second digit of the reference numeral representing the step are the same as the first digit and the second digit of the corresponding step of FIG. 5. In steps of FIG. 9, for steps corresponding to the steps of FIG. 7 according to the second embodiment, a first digit and a second digit of the reference numeral representing the step are the same as the first digit and the second digit of the corresponding step of FIG. 7.

In the computer 60*a* and the printer 1*a*, processing of step S113 to step S163 is performed.

Processing of step S113 to step S133*b* is the same as the processing of step S112 to step S132*b* of FIG. 7. Processing of step S143 is the same as the processing of step S141 of FIG. 5, except that a target printer is the printer 1*a*.

In step S153, the CPU 62 of the computer 60*a* transmits, to the server 70, for the drive waveform candidate Wci included in the first selection waveform Ws1, the parameters for defining the shape of the waveform and the ink ejection amount Pwa in association with a combination of the information for specifying a type of the ink ejection head 41, the temperature Ta, and the information for specifying the drive waveform candidate Wci. The information for specifying the type of the ink ejection head 41 is information for distinguishing a design of the ink ejection head 41. In the liquid ejection heads having the same design, pieces of the information for specifying the type of the liquid ejection head match with each other. The information for specifying the type of the ink ejection head 41 is stored in advance in the memory 13 of the printer 1. In FIG. 1, the information for specifying the type of the ink ejection head 41 is illustrated as a "head ID 132". The CPU 62 of the computer 60*a* receives, from the printer 1*a*, the information for specifying the type of the ink ejection head 41.

The CPU 72 of the server 70 receives, from the computer 60*a*, the parameters for defining the shape of the waveform and the ink ejection amount Pwa in association with the combination of the information for specifying the type of the ink ejection head 41, the temperature Ta, and the information for specifying the drive waveform candidate Wci included in the first selection waveform Ws1. The CPU 72 of the server 70 stores pieces of the information in the memory 73. In FIG. 8, for the first selection waveform Ws1, the parameters for defining the shape of the waveform and the ink ejection amount Pwa are illustrated as "first information Ic1*s*". Similarly, the server 70 receives the first information Ic1*s* from the plurality of printers connected to the server 70, and stores the first information Ic1*s* in association with the combination of the information for specifying the type of the ink ejection head 41, the temperature Ta, and the information for specifying the drive waveform candidate Wci included in the first selection waveform Ws1.

In step S163, the CPU 62 of the computer 60*a* determines the drive waveform W based on the first deviation information Id1. Specifically, the CPU 62 determines, as the drive waveform W of the drive signal COM to be applied to the drive element PZT of the ink ejection head 41 of the printer 1*a*, the drive waveform candidate Wci having a smallest difference Dwa among the drive waveform candidates Wci included in the first selection waveform Ws1 (refer to the equation (1)). Thereafter, processing in the computer 60*a* and the printer 1*a* is ended.

In the computer 60*b* and the printer 1*b*, processing of step S213 to step S333 is performed.

Processing of step S213 to step S233*b* is the same as the processing of step S212 to step S232*b* of FIG. 7. Processing of step S243 is the same as the processing of step S241 of FIG. 5, except that a target printer is the printer 1*b*.

That is, in the third embodiment, the second acquisition processing of acquiring the second information is executed by applying, under the environment of the temperature Tb, the drive waveform candidate Wci to the drive element PZT of another ink ejection head 41 having the same type as the type of the ink ejection head 41 associated with the first information Ic1 and measuring the ejection characteristic of the ejected ink droplets (refer to step S223 and step S233 in FIG. 9).

In step S253, the CPU 62 of the computer 60*b* transmits, to the server 70, a signal for requesting the first information Ic1*s* together with the information for specifying the type of the ink ejection head 41 of the printer 1*b*. The CPU 62 receives, from the computer 60*b*, the first information Ic1*s* matching with the type of the ink ejection head 41. The first information Ic1*s* includes the parameters for defining the shape of the waveform and the ink ejection amount Pwa in association with the combination of the information for specifying the type of the ink ejection head 41, the temperature Ta, and the information for specifying the drive waveform candidate Wci included in the first selection waveform Ws1.

That is, in the third embodiment, the first acquisition processing of acquiring the first information is executed by reading the first information Ic1*s* stored in the server 70 in association with the type of the ink ejection head 41 and the temperature Ta.

Processing of step S313 to step S333 is the same as the processing of step S311 to step S331 of FIG. 5, except that a target printer is the printer 1*b*.

According to such an aspect, as in the first embodiment, it is possible to determine the drive waveform W for which the ejection characteristic is unlikely to be changed even when the temperature defining the environment condition in which the printer is provided is changed.

According to the present embodiment, the user of the printer 1a and the computer 60b can acquire the first information Ic1s representing the ejection characteristic of the ink droplets under the environment of the temperature Ta (refer to step S253 of FIG. 9) without performing liquid ejection by using the ink ejection head 41 under the environment of the temperature Ta. Therefore, it is possible to easily determine the drive waveform W from the plurality of drive waveform candidates Wci.

D. Fourth Embodiment

Figure 10:
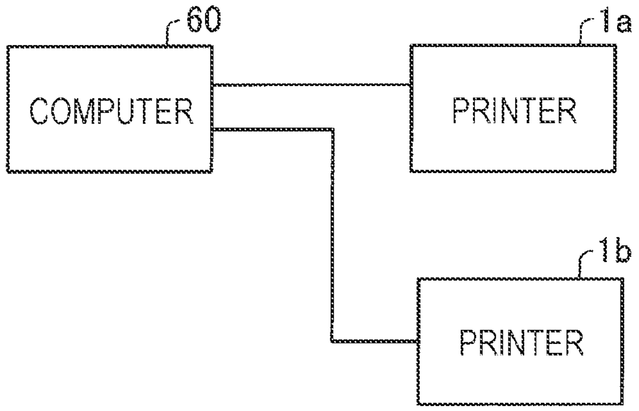
FIG. 10 is a block diagram illustrating printers and a computer included in a printing system according to a fourth embodiment.

FIG. 10 is a block diagram illustrating printers 1a and 1b and a computer 60 included in a printing system according to a fourth embodiment. In the printing system according to the fourth embodiment, two printers 1a and 1b are connected to the computer 60.

The configuration of the computer 60 is the same as the configuration of the computer 60 according to the first embodiment described with reference to FIG. 1. The computer 60 may transmit pieces of print data different from each other to the printers 1a and 1b. The computer 60 may also transmit the same print data to the printers 1a and 1b. The computer 60 transmits, to the printers 1a and 1b, a parameter representing the drive waveform of the drive signal. In the present embodiment, the computer 60 transmits, to the printers 1a and 1b, the same parameter representing the drive waveform of the drive signal. That is, the printers 1a and 1b are driven by the drive signal COM including the same drive waveform W.

The configurations of the printers 1a and 1b are the same as the configuration of the printer 1 according to the first embodiment described with reference to FIG. 1 and FIG. 2. The printers 1a and 1b may be printers of the same model. In the environments in which the printers 1a and 1b are provided, temperatures, humidities, and atmospheric pressures are different from each other.

Figure 11:
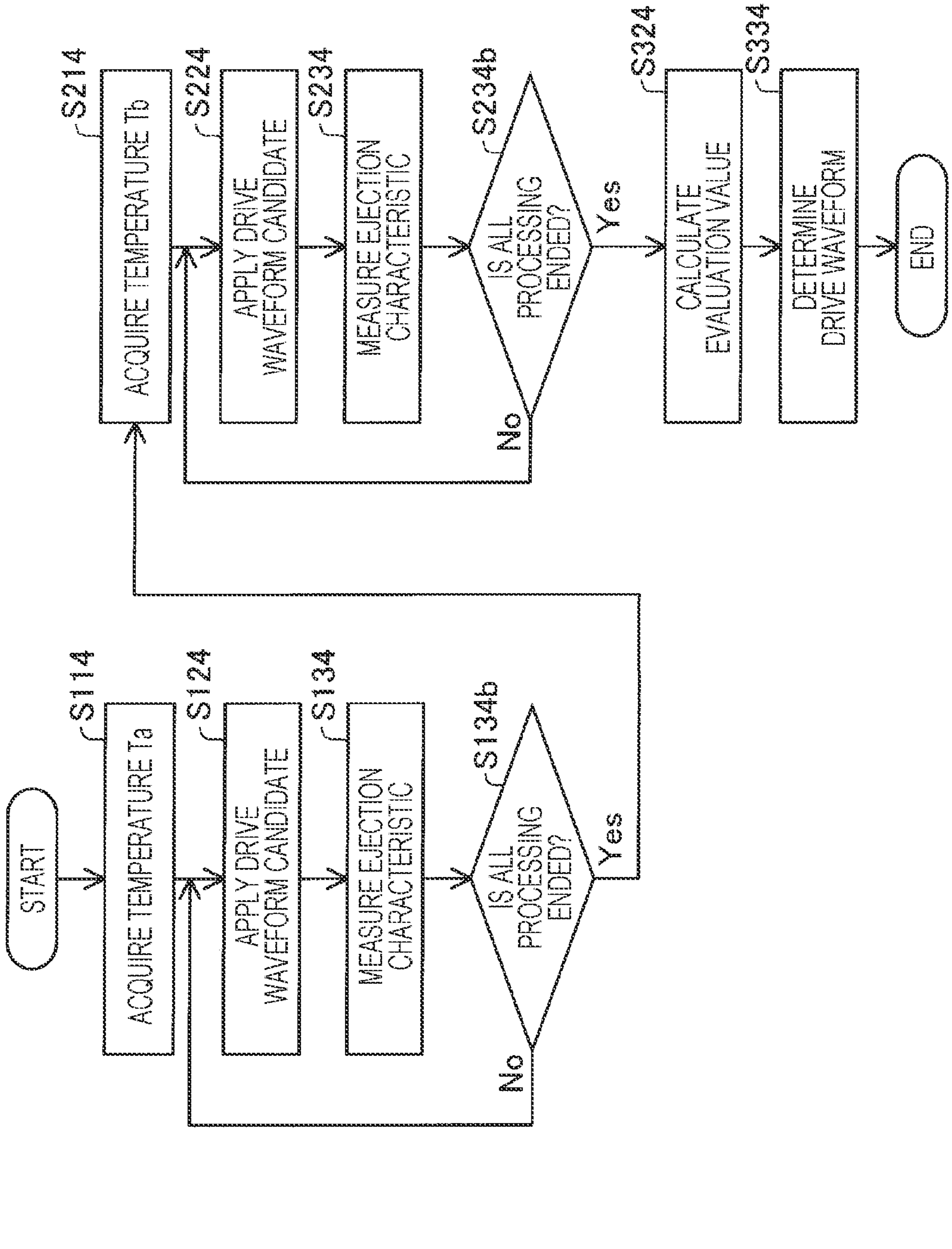
FIG. 11 is a flowchart illustrating a method of determining the drive waveform of the drive signal to be applied to the printers according to the fourth embodiment.

FIG. 11 is a flowchart illustrating a method of determining the drive waveform of the drive signal to be applied to the printers 1a and 1b according to the fourth embodiment. The method of FIG. 11 corresponds to the method according to the first embodiment illustrated in FIG. 5, the method according to the second embodiment illustrated in FIG. 7, and the method according to the third embodiment illustrated in FIG. 9. In steps of FIG. 11, for steps corresponding to the steps of FIG. 5 according to the first embodiment, a first digit and a second digit of the reference numeral representing the step are the same as the first digit and the second digit of the corresponding step of FIG. 5. In steps of FIG. 11, for steps corresponding to the steps of FIG. 7 according to the second embodiment, a first digit and a second digit of the reference numeral representing the step are the same as the first digit and the second digit of the corresponding step of FIG. 7. In steps of FIG. 11, for steps corresponding to the steps of FIG. 9 according to the third embodiment, a first digit and a second digit of the reference numeral representing the step are the same as the first digit and the second digit of the corresponding step of FIG. 9.

Processing of step S114 to step S134b is the same as the processing of step S111 to step S131b of FIG. 5, except that a target printer is the printer 1a.

Processing of step S214 to step S234b is the same as the processing of step S211 to step S231b of FIG. 5, except that a target printer is the printer 1b.

In step S324, the CPU 62 of the computer 60 executes the third acquisition processing for each of the plurality of predetermined drive waveform candidates Wci. That is, the CPU 62 acquires, for each drive waveform candidate Wci, an evaluation value DP4 on a difference between the ejection characteristic indicated by the first information Ic1 and the ejection characteristic indicated by the second information Ic2, the ejection characteristics being obtained by using the same drive waveform candidate.

At that time, the CPU 62 acquires an evaluation value DP4 including the value Dwa represented by the first deviation information Id1 and the value Dwb represented by the second deviation information Id2. As a result, the drive waveform W is determined based on the first deviation information Id1 and the second deviation information Id2.

As a specific example, the CPU 62 calculates an evaluation value DP4 for each drive waveform candidate Wci by the following equation.

$$DP4 = Dwa^2 + Dwb^2 + DP1^2 = (Pwt - Pwa)^2 + (Pwt - Pwb)^2 + (Pwb - Pwa)^2 \qquad (4)$$

By performing the processing, it is possible to determine the drive waveform W in consideration of the following point in addition to the difference between the ejection characteristic Pwa under the environment of the temperature Ta and the ejection characteristic Pwb under the environment of the temperature Tb, the difference being represented by the third information Ic3. That is, it is possible to determine the drive waveform W in consideration of the difference Dwa and the difference Dwb, the difference Dwa being represented by the first deviation information Id1 and indicating the difference between the ejection characteristic Pwa under the environment of the temperature Ta and the ideal ejection characteristic Pwt, and the difference Dwb being represented by the second deviation information Id2 and indicating the difference between the ejection characteristic Pwb under the environment of the temperature Tb and the ideal ejection characteristic Pwt. More specifically, the drive waveform candidate Wci having the small difference Dwa and the small difference Dwb is preferentially determined as the drive waveform W, the difference Dwa indicating the difference between the ejection characteristic Pwa under the environment of the temperature Ta and the ideal ejection characteristic Pwt, and the difference Dwb being represented by the second deviation information Id2 and indicating the difference between the ejection characteristic Pwb under the environment of the temperature Tb and the ideal ejection characteristic Pwt.

Therefore, for example, when a drive waveform candidate has a small difference between the ejection characteristic Pwa under the environment of the temperature Ta and the ejection characteristic Pwb under the environment of the temperature Tb and the ejection characteristic Pwa under the environment of the temperature Ta and the ejection characteristic Pwb under the environment of the temperature Tb both greatly deviate from the ideal ejection characteristic Pwt, it is possible to decrease a possibility that the drive waveform candidate is determined as the drive waveform W.

In step S334, the CPU 62 determines the drive waveform W based on the evaluation value DP4. Specifically, the CPU 62 determines, as the drive waveform W of the drive signal COM to be applied to the drive element PZT of the ink ejection head 41 of the printers 1a and 1b, the drive waveform candidate Wci having the smallest evaluation value DP4 among the drive waveform candidates Wci.

As a result, in step S331, the drive waveform W is determined based on the first information Ic1, the second information Ic2, and the plurality of predetermined drive waveform candidates Wci. The drive waveform candidate having a small difference between the ejection characteristic indicated by the first information Ic1 and the ejection characteristic indicated by the second information Ic2 is preferentially determined as the drive waveform W (refer to a third item of equation (4)).

According to such an aspect, as in the first embodiment, it is possible to determine the drive waveform W for which the ejection characteristic is unlikely to be changed even when the temperature defining the environment condition in which the printer is provided is changed.

E. Fifth Embodiment

A configuration of a printing system according to a fifth embodiment is the same as the configuration of the printing system according to the first embodiment (refer to FIG. 1). Here, in the printing system according to the fifth embodiment, a method of determining the drive waveform of the drive signal is partially different from the method of determining the drive waveform of the drive signal according to the first embodiment in that processing of step S325, step S415, and step S425 is included. Other steps of the fifth embodiment are the same as the steps of the first embodiment.

Figure 12:
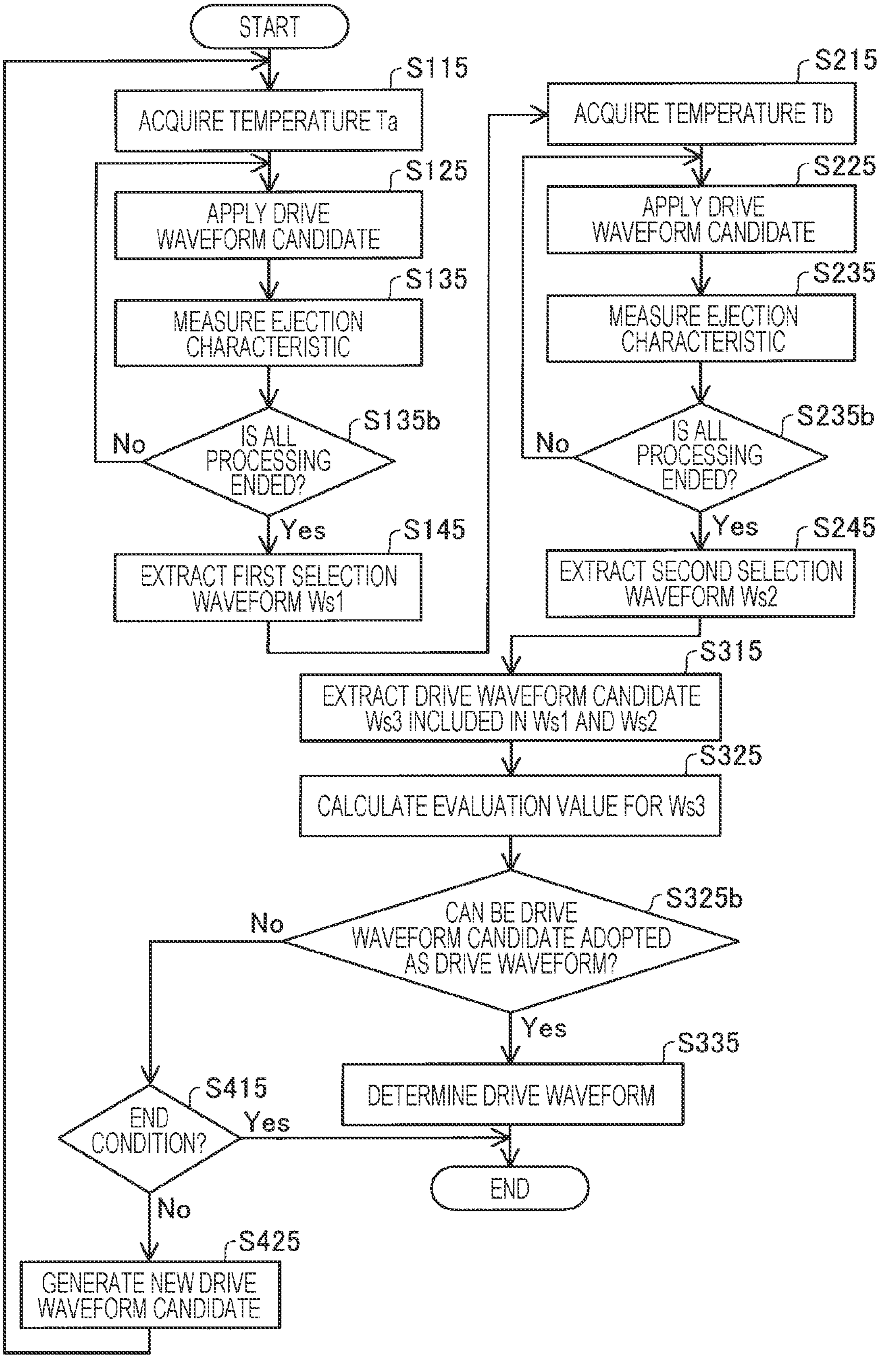
FIG. 12 is a flowchart illustrating a method of determining the drive waveform of the drive signal to be applied to the printers according to a fifth embodiment.

FIG. 12 is a flowchart illustrating a method of determining the drive waveform of the drive signal to be applied to the printers 1*a* and 1*b* according to the fifth embodiment. The method of FIG. 12 corresponds to the method according to the first embodiment illustrated in FIG. 5. In steps of FIG. 12, for steps corresponding to the steps of FIG. 5 according to the first embodiment, a first digit and a second digit of the reference numeral representing the step are the same as the first digit and the second digit of the corresponding step of FIG. 5.

Processing of step S115 to step S325 is the same as the processing of step S111 to step S321 of FIG. 5.

In step S325*b*, the CPU 62 of the computer 60 determines whether or not the drive waveform candidate Wci included in the third selection waveform Ws3 satisfies a predetermined condition. The predetermined condition is a condition which is to be satisfied by the drive waveform to be applied to the printer 1. When the drive waveform candidate Wci does not satisfy the predetermined condition, the drive waveform candidate Wci is not adopted as the drive waveform to be applied to the printer 1. Here, as the predetermined condition, a condition that the evaluation value DP1 is equal to or smaller than a predetermined threshold value Thd is adopted. Here, another condition may be adopted as the predetermined condition.

When a drive waveform candidate Wci for which the evaluation value DP1 is equal to or smaller than the predetermined threshold value Thd exists, processing proceeds to step S335. When a drive waveform candidate Wci for which the evaluation value DP1 is equal to or smaller than the predetermined threshold value Thd does not exist, processing proceeds to step S415. That is, a case where processing of step S415 and subsequent processing of step S425 are executed corresponds to a case where the drive waveform W is not selected from the plurality of predetermined drive waveform candidates Wci.

In step S335, the CPU 62 determines the drive waveform W based on the evaluation value DP1 (refer to equation (3)). Specifically, the CPU 62 determines, as the drive waveform W of the drive signal COM to be applied to the drive element PZT of the ink ejection head 41 of the printers 1*a* and 1*b*, the drive waveform candidate Wci having the smallest evaluation value DP1 among the drive waveform candidates Wci which are included in the third selection waveform Ws3 and satisfy the condition in step S325*b*. The waveform determination section 624 as a functional section of the CPU 62 executes processing of step S325*b* and step S335.

In step S415, the CPU 62 determines an end condition. Specifically, the CPU 62 determines whether or not the number of times processing proceeds to step S415 through step S325*b* exceeds a predetermined threshold value. When the number of times processing proceeds to step S415 through step S325*b* exceeds the predetermined threshold value, processing is ended. When the number of times processing proceeds to step S415 through step S325*b* does not exceed the predetermined threshold value, processing proceeds to step S425.

In step S425, the CPU 62 generates a new drive waveform candidate based on the first information Ic1, the second information Ic2, and at least a part of the plurality of predetermined drive waveform candidates Wci. Specifically, the CPU 62 determines a set of parameters for defining one or more new drive waveform candidates Wci by using an optimization method based on the parameters for defining the drive waveform candidate Wci included in the third selection waveform Ws3 and the evaluation value DP1 of the drive waveform candidate Wci. The evaluation value DP1 is information determined based on the first information Ic1 and the second information Ic2 (refer to equation (3)). The drive waveform candidate Wci included in the third selection waveform Ws3 corresponds to at least a part of the plurality of predetermined drive waveform candidates Wci. As the optimization method, various methods such as Bayesian optimization may be adopted.

Thereafter, processing of step S115 to step S325 is executed using the set of parameters for defining the drive waveform candidate Wci. As a result, the first acquisition processing and the second acquisition processing are executed for the new drive waveform candidate Wci (refer to step S125, step S135, step S225, and step S235 in FIG. 12). The drive waveform W is determined based on the new drive waveform candidate Wci, and the first information Ic1 and the second information Ic2 of the new drive waveform candidate Wci (refer to step S315 to step S335 in FIG. 12).

According to such an aspect, the drive waveform W for a better ejection characteristic can be determined without being limited to the plurality of predetermined drive waveform candidates Wci. In the fifth embodiment, in step S425, the new drive waveform candidate Wci is generated based on at least a part of the plurality of predetermined drive waveform candidates Wci. Thus, the drive waveform W is determined based on the plurality of predetermined drive waveform candidates Wci.

F. Sixth Embodiment

Figure 13:
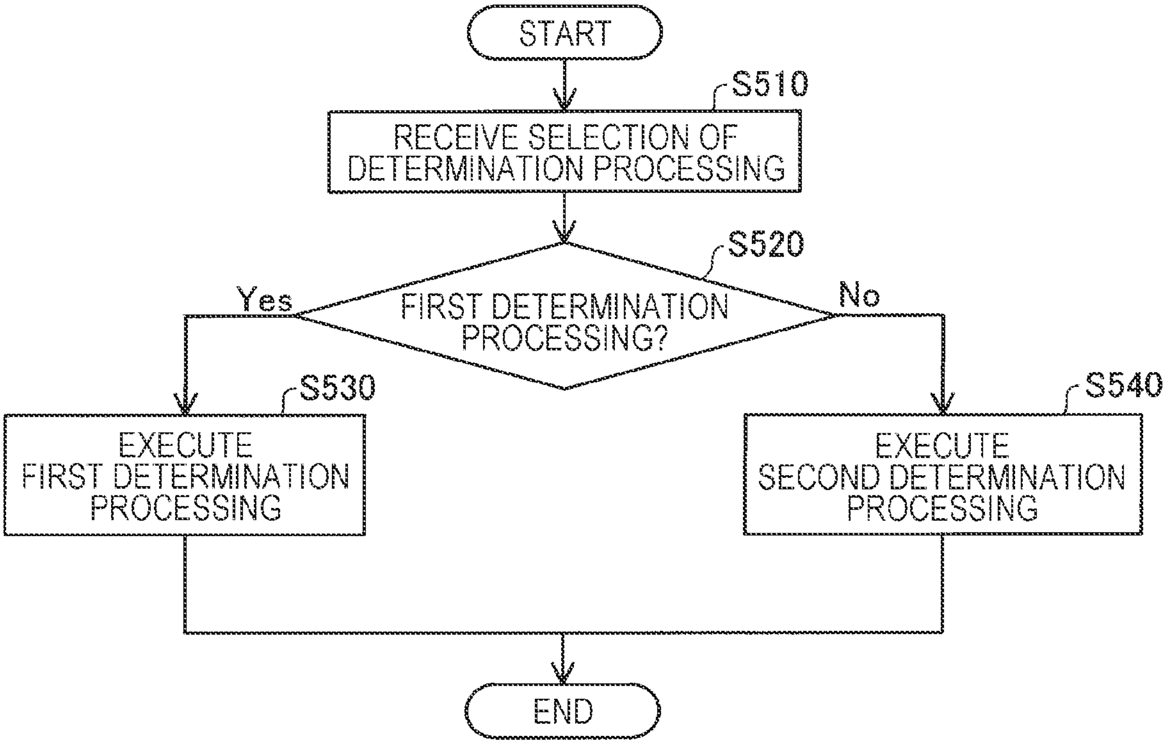
FIG. 13 is a flowchart illustrating a method of determining the drive waveform of the drive signal according to a sixth embodiment.

FIG. 13 is a flowchart illustrating a method of determining the drive waveform of the drive signal according to a sixth embodiment. The method of determining the drive waveform of the drive signal according to the sixth embodiment includes, as a part of processing, the method of determining the drive waveform of the drive signal according to the first embodiment to the fifth embodiment. A hardware configuration of a printing system according to the sixth embodiment may be the same as the hardware configuration according to the first embodiment to the fifth embodiment (refer to FIG. 1, FIG. 6, FIG. 8, and FIG. 10). Here, as the hardware configuration of the printing system according to the sixth embodiment, the hardware configuration according to the first embodiment will be described as an example.

In step S510, the CPU 62 of the computer 60 causes the display 64 to display a screen prompting the user to select a method of determining the drive waveform of the drive signal. Specifically, the CPU 62 prompts a determination as to whether the user desires to determine a drive waveform for which a printing quality is unlikely to be changed even when the environment condition in which the printer is provided is changed or whether the user desires to determine a drive waveform optimized for the current environment condition in which the printer is provided. Processing of determining the drive waveform for which a printing quality is unlikely to be changed even when the environment condition in which the printer is provided is changed is referred to as "first determination processing". Processing of determining the drive waveform optimized for the current environment condition in which the printer is provided is referred to as "second determination processing".

The CPU 62 receives selection of any determination processing of the first determination processing and the second determination processing via the keyboard 65 and the mouse 66. In FIG. 1, a functional section of the CPU 62 that has a function of performing processing of step S510 is illustrated as a "reception section 626".

In step S520, the CPU 62 of the computer 60 determines whether or not the first determination processing is selected. When the first determination processing is selected, processing proceeds to step S530. When the second determination processing is selected, processing proceeds to step S540.

In step S530, the CPU 62 of the computer 60 determines the drive waveform W by executing processing according to the first embodiment illustrated in FIG. 5. The waveform determination section 624 as a functional section of the CPU 62 executes processing of step S530 (refer to FIG. 1).

In step S540, the CPU 62 of the computer 60 determines the drive waveform W by executing, for the printer 1*b*, processing of step S112 to step S152 according to the second embodiment illustrated in FIG. 7. As a result, the drive waveform W is determined not based on the first information Ic1 on the environment of the temperature Ta but based on the second information Ic2 on the environment of the temperature Tb and the plurality of predetermined drive waveform candidates Wci. The waveform determination section 624 as a functional section of the CPU 62 executes processing of step S540 (refer to FIG. 1).

That is, in step S530 or step S540, the CPU 62 executes the determination processing selected in step S520 from the first determination processing and the second determination processing.

According to the present embodiment, even when the environment condition is unlikely to be changed or when a determination of a waveform optimized for an expected environment needs to be prioritized as compared with a correspondence to a change in the environment condition, the user can determine the drive waveform by selecting the second determination processing. As a result, the waveform optimized for the expected environment is determined.

In addition to the present embodiment, a Pareto solution in multi-objective optimization may be presented to the user such that the user can select a balance between the first determination processing and the second determination processing.

G. Other Embodiments

1. In the first embodiment, as the third information Ic3 on the difference between the ejection characteristic indicated by the first information Ic1 and the ejection characteristic indicated by the second information Ic2, the ejection characteristics being obtained by using the same drive waveform candidate, the evaluation value DP1 is calculated by the following equation (refer to step S321 in FIG. 5).

$$DP1=|Pwb-Pwa| \tag{3}$$

Further, in the fourth embodiment, the third information Ic3 is calculated as the evaluation value DP4 by the following equation (refer to step S324 in FIG. 11).

$$DP4=Dwa^2+Dwb^2+DP^2=(Pwt-Pwa)^2+(Pwt-Pwb)^2+(Pwb-Pwa)^2 \tag{4}$$

Here, the third information Ic3 may be an evaluation value determined by another method. As the third information Ic3, for example, the following evaluation value DP7 may be adopted. It is assumed that a value indicated by the first environment condition, for example, a temperature is Ta, that a value indicated by the second environment condition, for example, a temperature is Tb, that a value of the ejection characteristic indicated by the first information Ic1 is Pa, and that a value of the ejection characteristic indicated by the second information Ic2 is Pb.

$$DP7=|Pb-Pa|/|Tb-Ta| \tag{5}$$

By determining the evaluation value DP7 in this way, it is possible to determine the drive waveform W having a small change rate in the ejection characteristic when the environment condition is changed. Further, the change rate is adopted as the evaluation value DP7 instead of the difference. Thus, by using the drive waveform W determined according to the evaluation value DP7, it is possible to eject the liquid from the head with a reasonable quality to some extent even when the value indicating the environment condition is not between Ta and Tb.

Further, as the third information Ic3, for example, the following evaluation values DP8 and DP9 may be adopted.

$$DP8=|Pvb-Pva|/|Tb-Ta| \tag{6}$$

$$DP9=\{(Pwb-Pwa)^{\wedge}2+(Pvb-Pva)^{\wedge}2\}^{\wedge}(½)/|Tb-Ta| \tag{7}$$

2. In the embodiment, the ejection characteristic considered when determining the drive waveform is an ejection amount of the liquid ejected from one nozzle of the ink ejection head 41 by an ejection operation of the drive element PZT (refer to step S131 and step S231 in FIG. 5). As a result, the drive waveform W in which the ejection amount of the liquid ejected from one nozzle by an ejection operation of the drive element PZT is unlikely to be changed even when the environment condition is changed is determined. On the other hand, the ejection characteristic considered when determining the drive waveform may be another characteristic.

For example, the ejection characteristic may an ejection speed of the liquid ejected from a nozzle of the liquid ejection head. According to such an aspect, it is possible to determine the drive waveform in which the ejection speed of the liquid ejected from the nozzle is unlikely to be changed even when the environment condition is changed.

According to such an aspect, Dva as the first deviation information Id1 is calculated as follows.

$$Dva=|Pvt-Pva| \tag{8}$$

Here, Pvt is an ideal ejection speed.

Pva is an ejection speed indicated by the first information Ic1, and is an ejection speed when a certain drive waveform candidate Wci is applied to the printer 1.

Dvb as the second deviation information Id2 is calculated as follows.

$$Dvb=|Pvt-Pvb| \quad (9)$$

Pvb is an ejection speed indicated by the second information Ic2, and is an ejection speed when a certain drive waveform candidate Wci is applied to the printer 1.

The evaluation value DPv as the third information Ic3 is calculated as follows.

$$DPv=|Pvb-Pva| \quad (10)$$

Further, the ejection characteristic may be an amount of sub-droplets, so-called satellites, ejected from one nozzle of the ink ejection head 41 by an ejection operation of the drive element PZT. According to such an aspect, it is possible to determine the drive waveform in which the amount of sub-droplets ejected from the nozzle is unlikely to be changed even when the environment condition is changed.

3. In the embodiment, the environment condition when the ejection characteristic is measured is defined by a temperature of the environment. The second environment condition includes a temperature Tb of the environment that is a value different from the temperature Ta of the first environment condition. As a result, the drive waveform W in which the ejection characteristic is unlikely to be changed even when the temperature of the environment is changed is determined. On the other hand, the environment condition when the ejection characteristic is measured may be defined by another parameter.

The environment condition when the ejection characteristic is measured may be defined by one or more parameters including a humidity of the environment. The second environment condition may include a humidity of the environment that is a value different from the humidity of the first environment condition. As a result, the drive waveform W in which the ejection characteristic is unlikely to be changed even when the humidity of the environment is changed is determined. The humidity of the environment may be acquired by the humidity sensor 52.

The environment condition when the ejection characteristic is measured may be defined by one or more parameters including an atmospheric pressure of the environment. The second environment condition may include an atmospheric pressure of the environment that is a value different from the atmospheric pressure of the first environment condition. As a result, the drive waveform W in which the ejection characteristic is unlikely to be changed even when the atmospheric pressure of the environment is changed is determined. The atmospheric pressure of the environment may be acquired by the atmospheric pressure sensor 53.

That is, the environment condition may be a condition defined by at least one of the temperature of the environment, the humidity of the environment, or the atmospheric pressure of the environment.

4. In the first embodiment, in step S161 of FIG. 5, the user changes the temperature of the environment in which the printer 1 is provided by using a temperature changing machine. On the other hand, processing of step S121 to step S131*b* and processing of step S221 to step S231*b* may be performed under different environments by being performed at different time zones such as morning and noon, immediately before operating of a factory and during operating of a factory, or the like.

5. In the fifth embodiment, in step S325*b* of FIG. 12, it is determined whether or not the evaluation value DP1 is equal to or smaller than a predetermined threshold value Thd. On the other hand, in step S325*b*, a determination based on another condition may be performed. For example, the CPU 62 may present an image of an ejection state of the ink droplets to the user via the display 64, and prompt the user to determine whether or not the user is satisfied with the ejection state of the ink droplets, the image being acquired by the CCD camera 55. The CPU 62 may receive a determination result via the keyboard 65 and the mouse 66.

6. In the first embodiment, the CPU 62 of the computer 60 determines the drive waveform by controlling the printer 1. On the other hand, the printer may be configured to perform the functions of the computer according to each embodiment. The printer may be connected to the server without passing through the computer 60. Further, the server to which the printer is connected may be configured to perform the functions of the computer according to each embodiment.

7. In the fourth embodiment, the ejection characteristic is measured by using the ink ejection heads 41 of the printers 1*a* and 1*b* different from each other (refer to step S134 and step S234 in FIG. 10 and FIG. 11). On the other hand, the measurement of the ejection characteristic may be performed using different ink ejection heads of one printer.

8. In the first embodiment, among the drive waveform candidates Wci included in the third selection waveform Ws3 which is selected in advance, the drive waveform candidate Wci having the smallest evaluation value DP1 is determined as the drive waveform W of the drive signal COM to be applied to the drive element PZT of the ink ejection head 41. On the other hand, the drive waveform W may be determined by, for example, setting constraint conditions for each of the value Dwa of the first deviation information Id1 and the value Dwb of the second deviation information Id2 and performing constrained single-objective optimization processing using the evaluation value DP1 as an objective function.

9. In the embodiment, the ejection characteristic is measured under two environment conditions, and the drive waveform W of the drive signal COM is determined (refer to FIGS. 5, 7, 9, 11, and 12). On the other hand, the ejection characteristic may be measured under three or more environment conditions, and the drive waveform of the drive signal may be determined.

10. In the embodiment, the liquid ejection apparatus is a printer that ejects an ink. On the other hand, the liquid ejection apparatus may be another apparatus such as an apparatus for manufacturing an electronic device.

11. In the embodiment, the first deviation information Id1 indicates a difference between the ejection characteristic indicated by the first information Ic1 and a target ejection characteristic which is an ideal ejection characteristic. On the other hand, the first deviation information may not be information indicating the difference itself between the ejection characteristic indicated by the first information and the target ejection characteristic which is an ideal ejection characteristic. That is, the first deviation information may be information on the difference between the ejection characteristic indicated by the first information and the target ejection characteristic which is an ideal ejection characteristic.

12. In the embodiment, in step S153 of FIG. 9, the parameters for defining the shape of the waveform and the ink ejection amount Pwa are stored in the memory 73 in association with the combination of the information for specifying the type of the ink ejection head 41, the temperature Ta, and the information for specifying the drive waveform candidate Wci included in the first selection waveform Ws1. On the other hand, the first information may be associated with a serial number, an individual number, or a lot number of the liquid ejection head. That is, the first information may be associated with the liquid ejection head.

13. In the embodiment, in step S331, the drive waveform W is determined based on the first information Ic1, the second information Ic2, and at least a part of the plurality of predetermined drive waveform candidates Wci (refer to step S141, step S241, step S321, and step S331 in FIG. 5). On the other hand, the drive waveform may be determined not based on the plurality of drive waveform candidates but based on the first information and the second information.

14. In the embodiment, in step S540, the drive waveform W is determined not based on the first information Ic1 but based on the second information Ic2 on the environment of the temperature Tb and the plurality of predetermined drive waveform candidates Wci.

On the other hand, the drive waveform may be determined not based on the first information and the plurality of drive waveform candidates but based on the second information.

H. Other Embodiments

The present disclosure is not limited to the above-described embodiment, and may be realized in various forms within a scope described in the aspects. For example, the present disclosure may also be realized by the following forms. In order to solve some or all of the objectives of the present disclosure or in order to achieve some or all of the effects of the present disclosure, the technical features in the embodiments corresponding to the technical features in the following embodiments may be replaced or combined as appropriate. Further, as long as the technical feature is not described as essential in this specification, the technical feature may be appropriately deleted.

1. According to an aspect of the present disclosure, there is provided a drive waveform determination method for determining a drive waveform of a drive signal to be applied to a drive element of a liquid ejection head to eject a liquid from the liquid ejection head. The method includes: a first acquisition step of executing first acquisition processing for acquiring, in a first environment condition which is a condition of an environment in which the liquid ejection head is provided, first information on an ejection characteristic of the liquid when each of a plurality of drive waveform candidates is applied to the drive element; a second acquisition step of executing second acquisition processing for acquiring, in a second environment condition which is a condition of the environment in which the liquid ejection head is provided and is different from the first environment condition, second information on the ejection characteristic when each of the plurality of drive waveform candidates is applied to the drive element; and a waveform determination step of determining the drive waveform based on the first information and the second information.

According to such an aspect, it is possible to determine the drive waveform in which the ejection characteristic is unlikely to be changed even when the environment condition is changed.

2. The drive waveform determination method according to the aspect may further include: a third acquisition step of executing, for at least a part of the plurality of drive waveform candidates, third acquisition processing for acquiring third information on a difference between the ejection characteristic indicated by the first information and the ejection characteristic indicated by the second information, the ejection characteristics being obtained by using the same drive waveform candidate. In the aspect, the waveform determination step may be a step of determining the drive waveform based on the third information.

According to such an aspect, it is possible to determine the drive waveform having a small difference in ejection characteristic when the environment condition is changed.

3. In the drive waveform determination method according to the aspect, $DP=|Pb-Pa|$ when it is assumed that a value of the ejection characteristic indicated by the first information is Pa, that a value of the ejection characteristic indicated by the second information is Pb, and that a value indicated by the third information is DP.

According to such an aspect, it is possible to determine the drive waveform in consideration of a difference in ejection characteristic when the environment condition is changed.

4. In the drive waveform determination method according to the aspect, $DP=|Pb-Pa|/|Tb-Ta|$ when it is assumed that a value indicated by the first environment condition is Ta, that a value indicated by the second environment condition is Tb, that a value of the ejection characteristic indicated by the first information is Pa, that a value of the ejection characteristic indicated by the second information is Pb, and that a value indicated by the third information is DP.

According to such an aspect, it is possible to determine the drive waveform W in consideration of a change rate of the ejection characteristic when the environment condition is changed.

5. In the drive waveform determination method according to the aspect, the waveform determination step may be a step of preferentially determining, as the drive waveform, a drive waveform candidate having a small difference between the ejection characteristic indicated by the first information and the ejection characteristic indicated by the second information, based on the third information.

According to such an aspect, it is possible to determine the drive waveform in which the ejection characteristic is unlikely to be changed even when the environment condition is changed.

6. The drive waveform determination method according to the aspect may further include: a fourth acquisition step of executing fourth acquisition processing for acquiring first deviation information on a difference between the ejection characteristic indicated by the first information and a target ejection characteristic as an ideal ejection characteristic and acquiring second deviation information on a difference between the ejection characteristic indicated by the second information and the target ejection characteristic, for each of the plurality of drive waveform candidates. In the aspect, the waveform determination step may be a step of determining the drive waveform based on the first deviation information and the second deviation information.

According to such an aspect, it is possible to determine the drive waveform in consideration of the following point in addition to the difference between the ejection characteristic under the first environment condition and the ejection characteristic under the second environment condition, the difference being represented by the third information. That is, it is possible to determine the drive waveform in consideration of a difference which is represented by the first deviation information and indicates a difference between the ejection characteristic under the first environment condition and the ideal ejection characteristic, and a difference which is represented by the second deviation information and indicates a difference between the ejection characteristic under the second environment condition and the ideal ejection characteristic. Therefore, for example, when the drive waveform candidate has a small difference between the ejection characteristic under the first environment condition and the ejection characteristic under the second environment condition and the ejection characteristic under the first environment condition and the ejection characteristic under the second environment condition both greatly deviate from the ideal ejection characteristic, it is possible to decrease a possibility that the drive waveform candidate is determined as the drive waveform.

7. In the drive waveform determination method according to the aspect, assuming that a value of the ejection characteristic indicated by the first information is Pa, that a value of the ejection characteristic indicated by the second information is Pb, that a value of the target ejection characteristic is Pt, that a value indicated by the first deviation information is Da, and that a value indicated by the second deviation information is db, Da may be calculated by $Da=|Pt-Pa|$, and db may be calculated by $db=|Pt-Pb|$.

8. In the drive waveform determination method according to the aspect, the waveform determination step may be a step of preferentially determining, as the drive waveform, a drive waveform candidate having a small difference between the ejection characteristic indicated by the first information and the target ejection characteristic and having a small difference between the ejection characteristic indicated by the second information and the target ejection characteristic, based on the first deviation information and the second deviation information.

9. In the drive waveform determination method according to the aspect, the waveform determination step may be a step of preferentially determining, as the drive waveform, a drive waveform candidate for which the ejection characteristic indicated by the first information satisfies a first condition and the ejection characteristic indicated by the second information satisfies a second condition.

According to such an aspect, conditions are set for the ejection characteristic under the first environment condition and the ejection characteristic under the second environment condition, and the drive waveform candidate satisfying the conditions is more likely to be determined as the drive waveform.

10. In the drive waveform determination method according to the aspect, the ejection characteristic may be an ejection amount of the liquid ejected from one nozzle of the liquid ejection head by an ejection operation of the drive element.

According to such an aspect, it is possible to determine the drive waveform in which the ejection amount of the liquid ejected from one nozzle by an ejection operation of the drive element is unlikely to be changed even when the environment condition is changed.

11. In the drive waveform determination method according to the aspect, the ejection characteristic may be an ejection speed of the liquid ejected from a nozzle of the liquid ejection head.

According to such an aspect, it is possible to determine the drive waveform in which the ejection speed of the liquid ejected from the nozzle is unlikely to be changed even when the environment condition is changed.

12. In the drive waveform determination method according to the aspect, the first acquisition processing may include processing of acquiring the first information by reading the first information stored in a server in association with the liquid ejection head and the first environment condition, and the second acquisition processing may include processing of acquiring the second information by applying, under the second environment condition, a drive waveform candidate to a drive element of another liquid ejection head different from the liquid ejection head and measuring the ejection characteristic of the ejected liquid.

According to such an aspect, it is possible to acquire the first information representing the ejection characteristic of the liquid, without performing ejection of the liquid using the liquid ejection head. Therefore, it is possible to easily determine the drive waveform from the plurality of drive waveform candidates.

13. In the drive waveform determination method according to the aspect, the first acquisition processing may include processing of acquiring the first information by applying, under the first environment condition, a drive waveform candidate to the drive element and measuring the ejection characteristic of the liquid ejected from the liquid ejection head, and the second acquisition processing may include processing of acquiring the second information by applying, under the second environment condition, a drive waveform candidate to the drive element and measuring the ejection characteristic of the liquid ejected from the liquid ejection head.

According to such an aspect, by using the drive element to which the drive signal having the determined drive waveform is applied, the ejection characteristic under the first environment condition and the ejection characteristic under the second environment condition are measured. Therefore, the drive waveform is determined so as to be suitable for the drive element to which the drive signal having the determined drive waveform is applied.

14. In the drive waveform determination method according to the aspect, the first acquisition processing may include processing of acquiring the first information by applying, under the first environment condition, a drive waveform candidate to the drive element and measuring the ejection characteristic of the liquid ejected from the liquid ejection head, and the second acquisition processing may include processing of acquiring the second information by applying, under the second environment condition, a drive waveform candidate to a drive element of another liquid ejection head different from the liquid ejection head and measuring the ejection characteristic of the liquid ejected from the other liquid ejection head.

According to such an aspect, the ejection characteristic under the first environment condition and the ejection characteristic under the second environment condition can be measured in parallel. Thus, the first information and the second information can be acquired in a short time.

15. The drive waveform determination method according to the aspect may further include: a step to be executed when the drive waveform is not selected from the plurality of drive waveform candidates, the step including generating a new drive waveform candidate based on the first information, the second information, and at least a part of the plurality of drive waveform candidates, executing the first acquisition processing and the second acquisition processing for the new drive waveform candidate, and determining the drive waveform based on the first information and the second information for the new drive waveform candidate, and the new drive waveform candidate.

According to such an aspect, the drive waveform can be determined without being limited to the plurality of drive waveform candidates.

16. In the drive waveform determination method according to the aspect, the first environment condition may include a temperature of the environment, and the second environment condition may include a temperature of the environment that is a value different from the temperature of the first environment condition.

According to such an aspect, it is possible to determine the drive waveform in which the ejection characteristic is unlikely to be changed even when the temperature of the environment is changed.

17. In the drive waveform determination method according to the aspect, the first environment condition may include a humidity of the environment, and the second environment condition may include a humidity of the environment that is a value different from the humidity of the first environment condition.

According to such an aspect, it is possible to determine the drive waveform in which the ejection characteristic is unlikely to be changed even when the humidity of the environment is changed.

18. In the drive waveform determination method according to the aspect, the first environment condition may include an atmospheric pressure of the environment, and the second environment condition may include an atmospheric pressure of the environment that is a value different from the atmospheric pressure of the first environment condition.

According to such an aspect, it is possible to determine the drive waveform in which the ejection characteristic is unlikely to be changed even when the atmospheric pressure of the environment is changed.

19. According to another aspect of the present disclosure, there is provided a non-transitory computer-readable storage medium storing a program causing a computer to execute the drive waveform determination method according to any one of application examples 1 to 18.

20. According to still another aspect of the present disclosure, there is provided a liquid ejection apparatus. The liquid ejection apparatus includes: a liquid ejection head that includes a drive element to be driven by applying a drive signal and ejects a liquid by driving of the drive element; a drive control section that controls the liquid ejection head; a first characteristic acquisition section that executes first acquisition processing for acquiring, in a first environment condition which is a condition of an environment in which the liquid ejection head is provided, first information representing an ejection characteristic of the liquid when each of a plurality of drive waveform candidates is applied to the drive element; a second characteristic acquisition section that executes second acquisition processing for acquiring, in a second environment condition which is a condition of the environment in which the liquid ejection head is provided and is different from the first environment condition, second information representing the ejection characteristic when each of the plurality of drive waveform candidates is applied to the drive element; and a waveform determination section that executes first determination processing for determining a drive waveform of a drive signal to be applied to the drive element based on the first information and the second information.

21. In the liquid ejection apparatus according to the aspect, the waveform determination section may execute second determination processing for determining the drive waveform not based on the first information but based on the second information, the liquid ejection apparatus may include a reception section that receives selection of any determination processing of the first determination processing and the second determination processing, and the waveform determination section may execute determination processing selected from the first determination processing and the second determination processing.

According to such an aspect, even when the environment condition is unlikely to be changed or when a determination of a waveform optimized for an expected environment needs to be prioritized as compared with a correspondence to a change in the environment condition, the user can cause a drive waveform determination apparatus to determine the drive waveform by selecting the second determination processing. As a result, the waveform optimized for the expected environment is determined.

The present disclosure may also be realized in various forms other than the drive waveform determination method, the liquid ejection apparatus, and the non-transitory computer-readable storage medium storing a program. For example, the present disclosure may be realized in forms of a drive waveform determination apparatus, a drive waveform determination support apparatus, a control method for these apparatuses, a computer program for realizing the control method, a non-transitory recording medium in which the computer program is recorded, and the like. Further, in the embodiments, the printer 1 has been described. On the other hand, the printer may not be used in the liquid ejection apparatus, and a so-called experimental apparatus or evaluation apparatus may be used instead as long as the apparatus has a function of ejecting a liquid.

What is claimed is:

1. A drive waveform determination method for determining a drive waveform of a drive signal to be applied to a drive element of a liquid ejection head to eject a liquid from the liquid ejection head, the method comprising:

a first acquisition step of executing first acquisition processing for acquiring, in a first environment condition which is a condition of an environment in which the liquid ejection head is provided, first information on an ejection characteristic of the liquid when each of a plurality of drive waveform candidates is applied to the drive element;

a second acquisition step of executing second acquisition processing for acquiring, in a second environment condition which is a condition of the environment in which the liquid ejection head is provided and is different from the first environment condition, second information on the ejection characteristic when each of the plurality of drive waveform candidates is applied to the drive element; and a waveform determination step of determining the drive waveform based on the first information and the second information.

2. The drive waveform determination method according to claim 1, further comprising:

a third acquisition step of executing, for at least a part of the plurality of drive waveform candidates, third acquisition processing for acquiring third information on a difference between the ejection characteristic indicated by the first information and the ejection characteristic indicated by the second information, the ejection characteristics being obtained by using the same drive waveform candidate, wherein the waveform determination step is a step of determining the drive waveform based on the third information.

3. The drive waveform determination method according to claim 2, wherein $$DP=|Pb-Pa|$$

when it is assumed that a value of the ejection characteristic indicated by the first information is Pa, that a value of the ejection characteristic indicated by the second information is Pb, and that a value indicated by the third information is DP.

4. The drive waveform determination method according to claim 2, wherein $$DP=|Pb-Pa|/|Tb-Ta|$$

when it is assumed that a value indicated by the first environment condition is Ta, that a value indicated by the second environment condition is Tb, that a value of the ejection characteristic indicated by the first information is Pa, that a value of the ejection characteristic indicated by the second information is Pb, and that a value indicated by the third information is DP.

5. The drive waveform determination method according to claim 2, wherein the waveform determination step is a step of preferentially determining, as the drive waveform, the drive waveform candidate having a small difference between the ejection characteristic indicated by the first information and the ejection characteristic indicated by the second information, based on the third information.

6. The drive waveform determination method according to claim 1, further comprising:

a fourth acquisition step of executing fourth acquisition processing for acquiring first deviation information on a difference between the ejection characteristic indicated by the first information and a target ejection characteristic as an ideal ejection characteristic and acquiring second deviation information on a difference between the ejection characteristic indicated by the second information and the target ejection characteristic, for each of the plurality of drive waveform candidates, wherein the waveform determination step is a step of determining the drive waveform based on the first deviation information and the second deviation information.

7. The drive waveform determination method according to claim 6, wherein $$Da=|Pt-Pa|$$

$$db=|Pt-Pb|$$

when it is assumed that a value of the ejection characteristic indicated by the first information is Pa, that a value of the ejection characteristic indicated by the second information is Pb, that a value of the target ejection characteristic is Pt, that a value indicated by the first deviation information is Da, and that a value indicated by the second deviation information is db.

8. The drive waveform determination method according to claim 6, wherein the waveform determination step is a step of preferentially determining, as the drive waveform, the drive waveform candidate having a small difference between the ejection characteristic indicated by the first information and the target ejection characteristic and having a small difference between the ejection characteristic indicated by the second information and the target ejection characteristic, based on the first deviation information and the second deviation information.

9. The drive waveform determination method according to claim 1, wherein the waveform determination step is a step of preferentially determining, as the drive waveform, the drive waveform candidate for which the ejection characteristic indicated by the first information satisfies a first condition and the ejection characteristic indicated by the second information satisfies a second condition.

10. The drive waveform determination method according to claim 1, wherein the ejection characteristic is an ejection amount of the liquid ejected from one nozzle of the liquid ejection head by an ejection operation of the drive element.

11. The drive waveform determination method according to claim 1, wherein the ejection characteristic is an ejection speed of the liquid ejected from a nozzle of the liquid ejection head.

12. The drive waveform determination method according to claim 1, wherein the first acquisition processing includes processing of acquiring the first information by reading the first information stored in a server in association with the liquid ejection head and the first environment condition, and the second acquisition processing includes processing of acquiring the second information by applying, under the second environment condition, the drive waveform candidate to a drive element of another liquid ejection head different from the liquid ejection head and measuring the ejection characteristic of the ejected liquid.

13. The drive waveform determination method according to claim 1, wherein the first acquisition processing includes processing of acquiring the first information by applying, under the first environment condition, the drive waveform candidate to the drive element and measuring the ejection characteristic of the liquid ejected from the liquid ejection head, and the second acquisition processing includes processing of acquiring the second information by applying, under the second environment condition, the drive waveform candidate to the drive element and measuring the ejection characteristic of the liquid ejected from the liquid ejection head.

14. The drive waveform determination method according to claim 1, wherein the first acquisition processing includes processing of acquiring the first information by applying, under the first environment condition, the drive waveform candidate to the drive element and measuring the ejection characteristic of the liquid ejected from the liquid ejection head, and the second acquisition processing includes processing of acquiring the second information by applying, under the second environment condition, the drive waveform candidate to a drive element of another liquid ejection head different from the liquid ejection head and measuring the ejection characteristic of the liquid ejected from the other liquid ejection head.

15. The drive waveform determination method according to claim 1, further comprising:

a step to be executed when the drive waveform is not selected from the plurality of drive waveform candidates, the step including generating a new drive waveform candidate based on the first information, the second information, and at least a part of the plurality of drive waveform candidates, executing the first acquisition processing and the second acquisition processing for the new drive waveform candidate, and determining the drive waveform based on the first information and the second information for the new drive waveform candidate, and the new drive waveform candidate.

16. The drive waveform determination method according to claim 1, wherein the first environment condition includes a temperature of the environment, and the second environment condition includes a temperature of the environment that is a value different from the temperature of the first environment condition.

17. The drive waveform determination method according to claim 1, wherein the first environment condition includes a humidity of the environment, and the second environment condition includes a humidity of the environment that is a value different from the humidity of the first environment condition.

18. A non-transitory computer-readable storage medium storing a program causing a computer to execute the drive waveform determination method according to claim 1.

19. A liquid ejection apparatus comprising:

a liquid ejection head that includes a drive element to be driven by applying a drive signal and ejects a liquid by driving of the drive element;

a drive control section that controls the liquid ejection head;

a first characteristic acquisition section that executes first acquisition processing for acquiring, in a first environment condition which is a condition of an environment in which the liquid ejection head is provided, first information representing an ejection characteristic of the liquid when each of a plurality of drive waveform candidates is applied to the drive element;

a second characteristic acquisition section that executes second acquisition processing for acquiring, in a second environment condition which is a condition of the environment in which the liquid ejection head is provided and is different from the first environment condition, second information representing the ejection characteristic when each of the plurality of drive waveform candidates is applied to the drive element; and a waveform determination section that executes first determination processing for determining a drive waveform of a drive signal to be applied to the drive element based on the first information and the second information.

20. The liquid ejection apparatus according to claim 19, wherein the waveform determination section executes second determination processing for determining the drive waveform not based on the first information but based on the second information, the liquid ejection apparatus includes a reception section that receives selection of any determination processing of the first determination processing and the second determination processing, and the waveform determination section executes determination processing selected from the first determination processing and the second determination processing.

* * * * *